US00RE35274E

United States Patent [19]

Furuichi

[11] E Patent Number: Re. 35,274

[45] Reissued Date of Patent: Jun. 18, 1996

[54] VARIABLE MAGNIFICATION COPYING MACHINE

[75] Inventor: Katsushi Furuichi, Yokohama, Japan

[73] Assignee: Canon Kabushiki Kaisha, Tokyo, Japan

[21] Appl. No.: 911,141

[22] Filed: Sep. 24, 1986

Related U.S. Patent Documents

Reissue of:

[64] Patent No.: 4,505,579
Issued: Mar. 19, 1985
Appl. No.: 410,073
Filed: Aug. 20, 1982

[51] Int. Cl.[6] ..... G03B 27/32

[52] U.S. Cl. ..... 355/55

[58] Field of Search ..... 355/55, 243, 204, 355/208

[56] References Cited

U.S. PATENT DOCUMENTS

| | | | |
|---|---|---|---|
| 3,792,926 | 2/1974 | Knechtel et al. | 355/29 |
| 3,897,148 | 7/1975 | Ritchie et al. | 355/57 |
| 4,095,880 | 6/1978 | Shogren et al. | 355/57 X |
| 4,099,866 | 7/1978 | Jones et al. | 355/58 |
| 4,120,578 | 10/1978 | Daniels et al. | 355/57 X |
| 4,262,193 | 4/1981 | Ozawa | 235/92 DN |
| 4,277,163 | 7/1981 | Ikesue et al. | 355/57 X |
| 4,287,461 | 9/1981 | Promis et al. . | |
| 4,302,098 | 11/1981 | Kan et al. | 355/55 |
| 4,310,241 | 1/1982 | Inoue | 355/60 |
| 4,330,196 | 5/1982 | Yamaguchi . | |
| 4,332,461 | 6/1982 | Cail et al. | 355/55 X |
| 4,332,464 | 6/1982 | Bartulis et al. . | |
| 4,353,097 | 10/1982 | Takeda et al. | 358/287 |
| 4,372,676 | 2/1983 | Miyata et al. | 355/55 X |
| 4,394,087 | 7/1983 | Irie et al. . | |
| 4,436,416 | 3/1984 | Negoro et al. | 355/57 |
| 4,441,805 | 4/1984 | Smith | 355/55 X |
| 4,459,010 | 7/1984 | Hinton et al. | 355/55 X |
| 4,498,759 | 2/1985 | Ogawa et al. | 355/55 X |
| 4,514,080 | 4/1985 | Matsuzawa et al. | 355/55 X |
| 4,602,867 | 7/1986 | Shimizu et al. | 355/55 |
| 4,619,521 | 10/1986 | Miyamoto | 355/55 X |

FOREIGN PATENT DOCUMENTS

| | | |
|---|---|---|
| 3123452 | 6/1981 | Germany . |
| 52-005529 | 1/1977 | Japan . |
| 53-088724 | 8/1978 | Japan . |
| 53-097418 | 8/1978 | Japan . |
| 5681865 | 6/1979 | Japan . |
| 55-021052 | 2/1980 | Japan . |
| 55-017119 | 2/1980 | Japan . |
| 55-048189 | 7/1980 | Japan . |
| 55-073945 | 11/1980 | Japan . |
| 56-011465 | 2/1981 | Japan . |
| 56-036657 | 4/1981 | Japan . |
| 56-081865 | 7/1981 | Japan . |
| 57-212459 | 12/1982 | Japan . |
| 1594653 | 8/1981 | United Kingdom . |

*Primary Examiner*—Khanh Dang
*Attorney, Agent, or Firm*—Fitzpatrick, Cella, Harper & Scinto

[57] ABSTRACT

A variable magnification copying machine comprises original size input means for inputting a size of an original, a paper size input means for inputting a size of a copy paper and a copy magnification calculation means for calculating a copy magnification factor based on the original size and the paper size. The copy magnification factor is calculated selectively based on widths in one direction of the original and the paper or based on widths in the other direction of the original and the paper.

51 Claims, 24 Drawing Sheets

| FIG.4A | FIG.4B |
|---|---|

| FIG. 5A | FIG. 5B |
|---|---|

DPY I
N=3 ?
N
Y
I1=I:I4,I3,I2,J4 AND J3=0
K⇐(RAM ADDRESS 36)
N=4 ?
N
Y
J4=I:I4,I3,I2,I1 AND J3=0
K⇐(RAM ADDRESS 37)
J3=I:I4,I3,I2,I1 AND J4=0
K⇐(RAM ADDRESS 38)
N⇐15

FIG. 12

| RAM ADDRESS | | | | | | | | |
|---|---|---|---|---|---|---|---|---|
| 1 ~ 8 | X ORIGINAL SIZE 4 | 2 | 0 | Y 2 | 9 | 7 | | PAPER SIZE 6 |
| 9 ~ 16 | x (PAPER SIZE) 2 | 9 | 7 | y 2 | 1 | 0 | | |
| 17 ~ 24 | x/X 0 | 7 | 0 | y/Y 0 | 7 | 0 | | |
| 25 ~ 32 | LENS POSITION PLS 1 | 0 | 0 | MAGNIFI-CATION M 0 | 7 | 0 | | |
| 33 ~ 40 | DISPLAY F | F | F | 1 | 0 | 0 | N | |
| 41 ~ 48 | CNT 0 | 3 | 0 | | | | | |
| 49 ~ 56 | | | | | | | | |
| 57 ~ | | | | | | | | |

FIG. 15

| CODE | | PAPER TRANSFER DIRECTION | x : y |
|---|---|---|---|
| 0 | A3 | LONGITUDINAL | 297 X 420 |
| 1 | A4 | LONGITUDINAL | 210 X 297 |
| 2 | A5 | LONGITUDINAL | 148 X 210 |
| 3 | B4 | LONGITUDINAL | 257 X 364 |
| 4 | B5 | LONGITUDINAL | 182 X 257 |
| 5 | B6 | LONGITUDINAL | 128 X 182 |
| 6 | A4 | LATERAL | 297 X 210 |
| 7 | A5 | LATERAL | 210 X 148 |
| 8 | B5 | LATERAL | 257 X 182 |
| 9 | B6 | LATERAL | 182 X 128 |
| 10 | ⋮ | | |
| 15 | | | |

| FIG. 17A | FIG. 17B |
|---|---|

FIG. 18

| RAM ADDRESS | | | | | | | | |
|---|---|---|---|---|---|---|---|---|
| 1 ~ 8 | X (ORIGINAL SIZE) 4 | 2 | 0 | Y 2 | 9 | 7 | | PAPER SIZE 6 |
| 9 ~ 16 | x (PAPER SIZE) 2 | 9 | 7 | y 2 | 1 | 0 | | |
| 17 ~ 24 | x/X 0 | 7 | 0 | y/Y 0 | 7 | 0 | | |
| 25 ~ 32 | LENS POSITION 1 | PULSE PLS 0 | 0 | MAGNIFI-CATION P 0 | 7 | 0 | | |
| 33 ~ 40 | DISPLAY 0 | 7 | 0 | 0 | 7 | 0 | N | |
| 41 ~ 48 | CNT 0 | 3 | 0 | | | | | |
| 49 ~ 56 | | | | | | | | |
| 57 ~ | | | | | | | | |

VARIABLE MAGNIFICATION COPYING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a variable magnification copying machine which senses a size of an original to set a magnification of a copying image.

2. Description of the Prior Art

In a prior art copying machine of this type, a magnification of a copying image is set independently of a size of an original by manipulating a reduction key or an enlargement key. Thus, the size of the original is not directly related to a magnification function. In addition, the prior art copying machine is constructed to enlarge or reduce only originals of standard sizes. Thus, since the orientations and the sizes of the originals are restricted, the copying machine has only several magnification factors.

A copying machine which can sense the size of the original has been known. In such a machine, however, indexes such as $A_4$, $A_3$, $B_4$ and $B_5$ are marked to indicate the sizes of the original and an operator reads one of the indexes and depresses one of buttons $A_4$, $A_3$ . . . . In another type of copying machine, instead of the manipulation buttons, a plurality of microswitches are arranged around an original table to sense the size of the original stepwise (Japanese Patent Application No. 54-141682). This copying machine, however, cannot continuously sense the size of the original.

SUMMARY OF THE INVENTION

It is an object of the present invention to provide a variable magnification copying machine which can copy an original with a variable magnification as required by a user.

It is another object of the present invention to provide a variable magnification copying machine which can copy either a standard size original or a non-standard size original at a magnification determined by longitudinal lengths or lateral lengths of the original and a copy paper.

It is another object of the present invention to provide a variable magnification copying machine having first input means for selecting either a longitudinal length or a lateral length of a reference copy paper and second input means for selecting to calculate a ratio of lengths of corresponding sides of an original and a copy paper to automatically determine a magnification or to determine the magnification in accordance with the first input means.

It is another object of the present invention to provide a variable magnification copying machine which can copy either a standard size original or a non-standard size original at variable magnifications in different directions of a copy paper.

It is another object of the present invention to provide a variable magnification copying machine which allows copying of an image of an original on an entire area of a copy paper.

It is a further object of the present invention to provide a variable magnification copying machine which can copy a non-regular size original to produce a regular size copy and enter a size data of the original to a control circuit of the copying machine with a simple construction.

BRIEF DESCRIPTION OF THE DRAWINGS

FIG. 12 shows a RAM map;

FIG. 15 shows a code list for a given paper size;

FIG. 18 shows a RAM map in the third embodiment; and

DETAILED DESCRIPTION OF THE PREFERRED EMBODIMENTS

Figure 1:
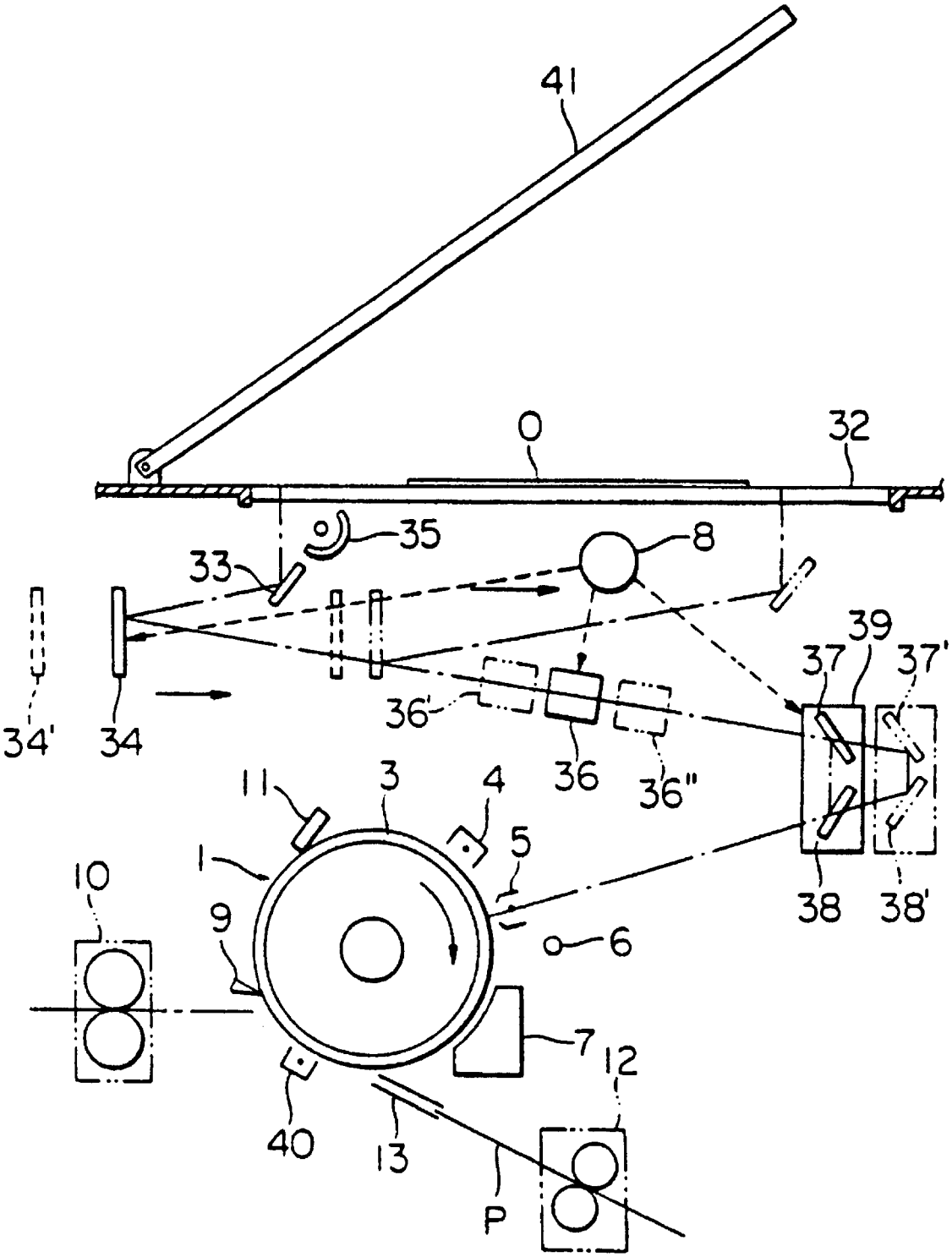
FIG. 1 shows a schematic view of a copying machine to which the present invention is applied.

Referring to FIG. 1, numeral 1 denotes a photosensitive drum which is rotated in a direction of an arrow by a motor not shown. Arranged on a periphery of the photosensitive drum 1 is a photosensitive member 3 which comprises a conductive base layer, a photoconductive layer and a transparent insulative surface layer.

The photosensitive drum 1 is rotated at a constant rotational speed in a non-magnification copy mode and a magnification copy mode. The photosensitive drum 1 is first evenly charged by a D.C. corona charger 4, and then an image of an original 0 is slit-exposed to the photosensitive drum 1 through an optical system to be described later and the photosensitive drum 1 is subjected to a corona discharge by an A.C. corona charger or a D.C. corona charger 5 of opposite polarity to the corona charger 4.

The corona charger 5 has a slit through which a light flux passes. Then, the photosensitive drum 1 is flat-illuminated by a lamp 6 so that an electrostatic latent image of high contrast corresponding to an image of the original is formed thereon.

The electrostatic latent image is developed to a toner image by a developer 7 to [visuarize] *visualize* the image, and the toner image transferred to a paper P fed to the periphery of the photosensitive drum 1, by a transfer charger 40 of the same polarity as the D.C. corona charger 4. After the transfer, the paper P is separated from the periphery of the photosensitive drum 1 by a separation pawl 9 and fed to a fixer 10 where the toner image is fixed to the paper P. On the other hand, after the transfer, residual toner image on the periphery of the photosensitive drum 1 is removed by a [clearner] *cleaner* 11 to prepare the photosensitive for the next copy operation. The paper P of a size determined by the copying magnification and an area of the original to be copied is conveyed from a paper cassette of the corresponding size, not shown, one at a time, by convey means 12 through a paper guide 13 to a transfer station.

The original 0 is mounted on a transparent original table 32 and an underside of the original is scanned in a direction of an arrow by an optical system which comprises a first mirror 33, a second mirror 34 which is moved at one half the velocity of the velocity of the first mirror 33 and an illumination lamp 35. The illumination lamp 35 is preferably supported on the same support as the first mirror 33. The first mirror 33 is moved at a velocity equal to a product of a circumferential velocity of the photosensitive drum 1 times a reciprocal of the copying magnification or a focusing magnification of a focusing lens 36. In order to vary the magnification, an optical path length between the lens and the original or between the lens and the photosensitive drum must be changed. When the magnification is unity (m=1), the lens 36, the second mirror 34 and third and fourth mirrors 37 and 38 are positioned as shown by solid lines, and when m<1 (reduction copy mode), the second mirror 34 is moved to a position 34' to change the relative position of the first and second mirrors 33 and 34 of the optical system and the focusing lens 36 is moved to a position 36". On the other hand, when m>1 (enlargement copy mode), the focusing lens 36 is moved to a position 36' and the third and fourth mirrors 37 and 38 are moved to positions 37' and 38', respectively. By changing the optical path lengths in this manner, the enlargement and the reduction of the original are attained.

During the scanning movement of the first and second mirrors 33 and 34, the lens 36 and the third and fourth mirrors 37 and 38 are fixed and not moved. Numeral 8 denotes a pulse motor which is used to move the lens 36 and the mirrors 34, 37 and 38 in accordance with the selected magnification.

Figure 2:
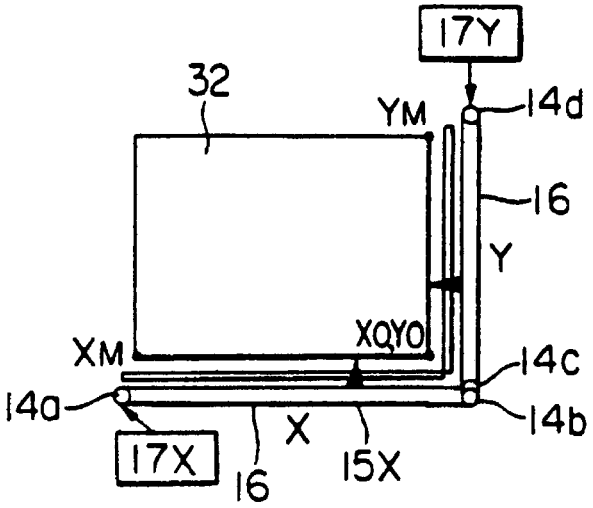
FIG. 2 shows an arrangement for sensing a size of an original.

FIG. 2 shows an arrangement for measuring a size of an image of the original mounted on an original mount glass. Indication levers 15X and 15Y are arranged along guides in a longitudinal direction (Y direction) and a lateral direction (X direction) of an effective original area, with a point ($X_0$, $Y_0$) being an origin point. A wire 16 is fixed to the indication levers 15X and 15Y and it is supported by pulleys 14a and 14b in the X direction and pulleys 14c and 14d in the Y direction. A potentiometer 17X is coupled to the pulley 14a and a potentiometer 17Y is coupled to the pulley 14d. The potentiometer 17X is mechanically coupled to the pulley 14a such that the potentiometer 17X is rotated by ten revolutions when the lever 15X is moved from $X_0$ to $X_M$. The potentiometer 17Y is coupled to the pulley 14d in a similar manner.

Figure 3:
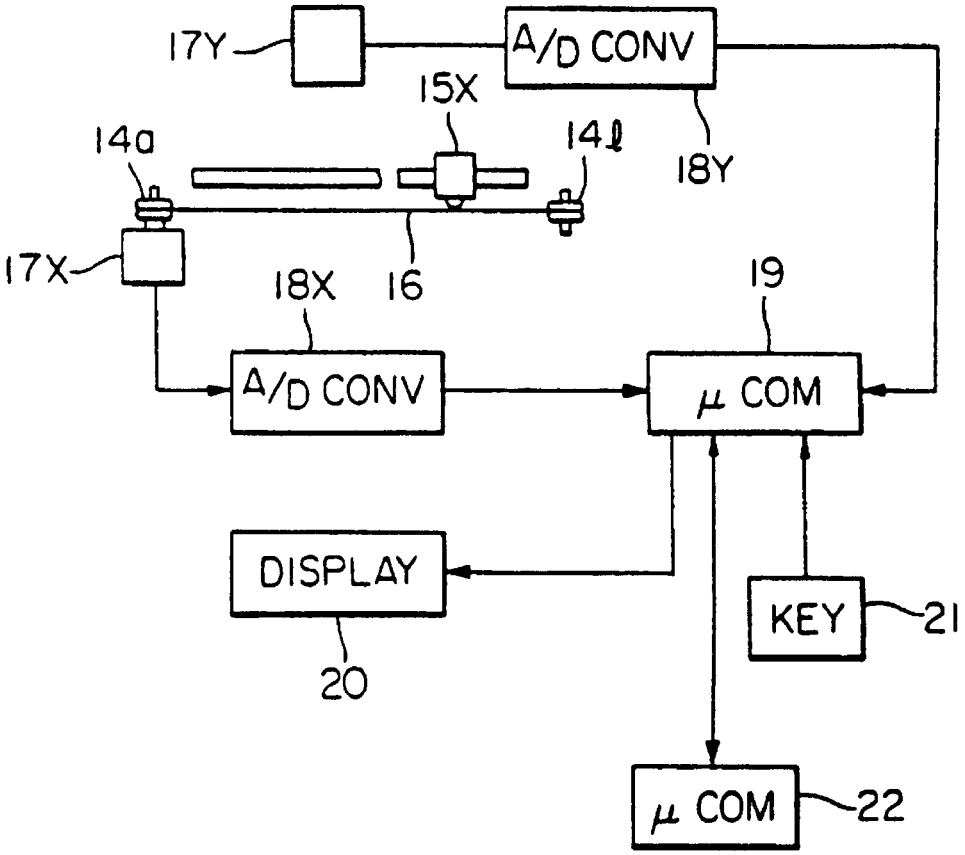
FIG. 3 shows a main electrical block diagram of the present invention.

FIG. 3 shows a schematic block diagram of the present embodiment and shows an electrical connection of the indication levers 15X and 15Y and the potentiometers 17X and 17Y. As the indication lever [15] *15X* is moved in the X direction, the wire 16 is moved therewith to rotate the pulleys 14a and 14b to rotate the potentiometer 17X. A voltage V(v) is applied across the potentiometer 17X so that it produces an output voltage proportional to the movement of the indication lever 15X. This voltage is converted to a digital signal by an A/D converter 18X and the digital signal is supplied to a microcomputer (μCOM) 19 which calculates the position of the indication lever. The same operation is carried out for the Y direction. In FIG. 3, the pulleys 14c and 14d and the indication lever 15Y are omitted, The calculation results are supplied to a main control circuit (μCOM) 22 of the copying machine to enlarge or reduce the original at a desired magnification.

Figures 4, 4A:
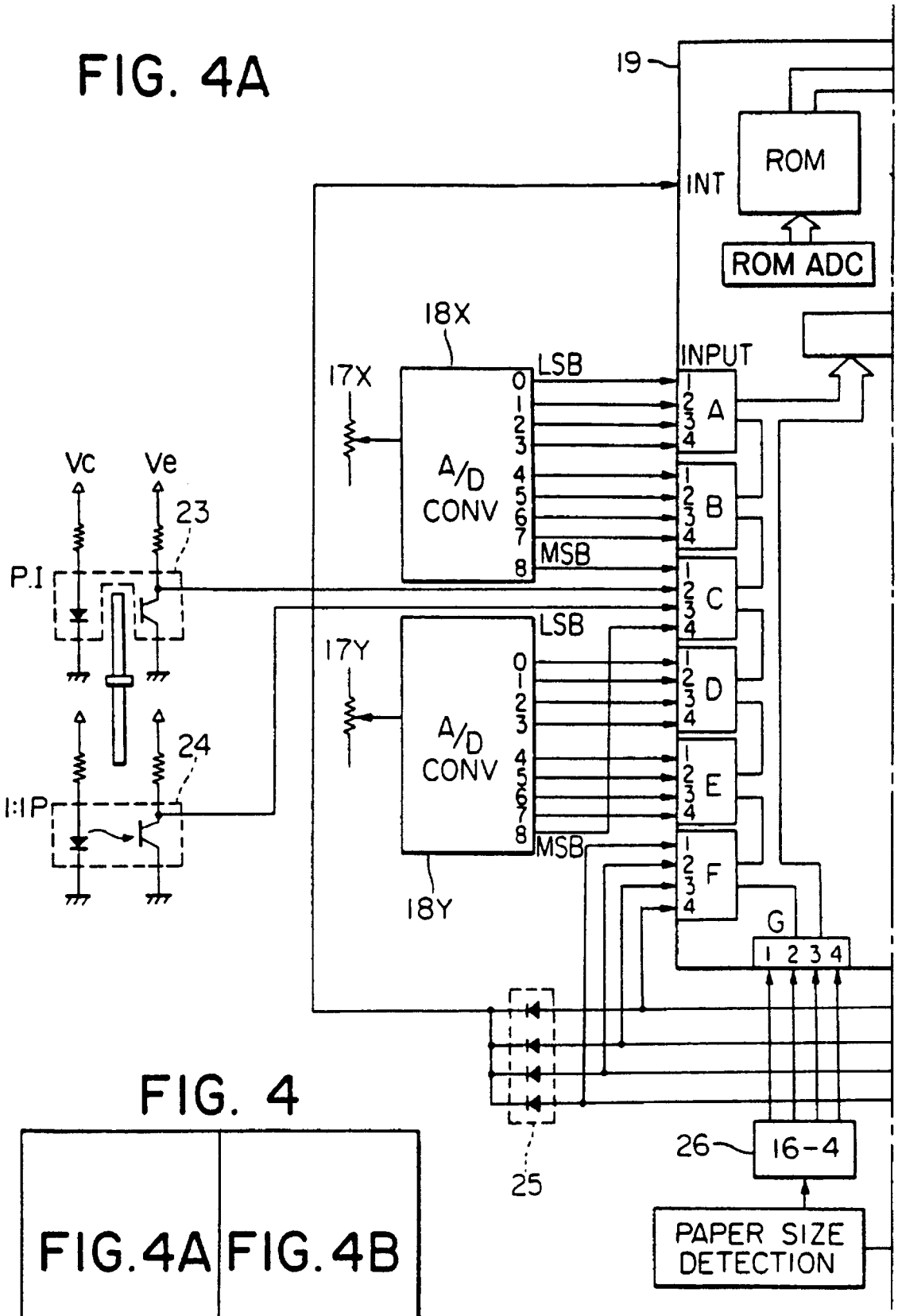
FIG. 4 composed of FIGS. 4A and 4B [show] *shows* an electrical circuit diagram of the present invention.
Figure 4B:
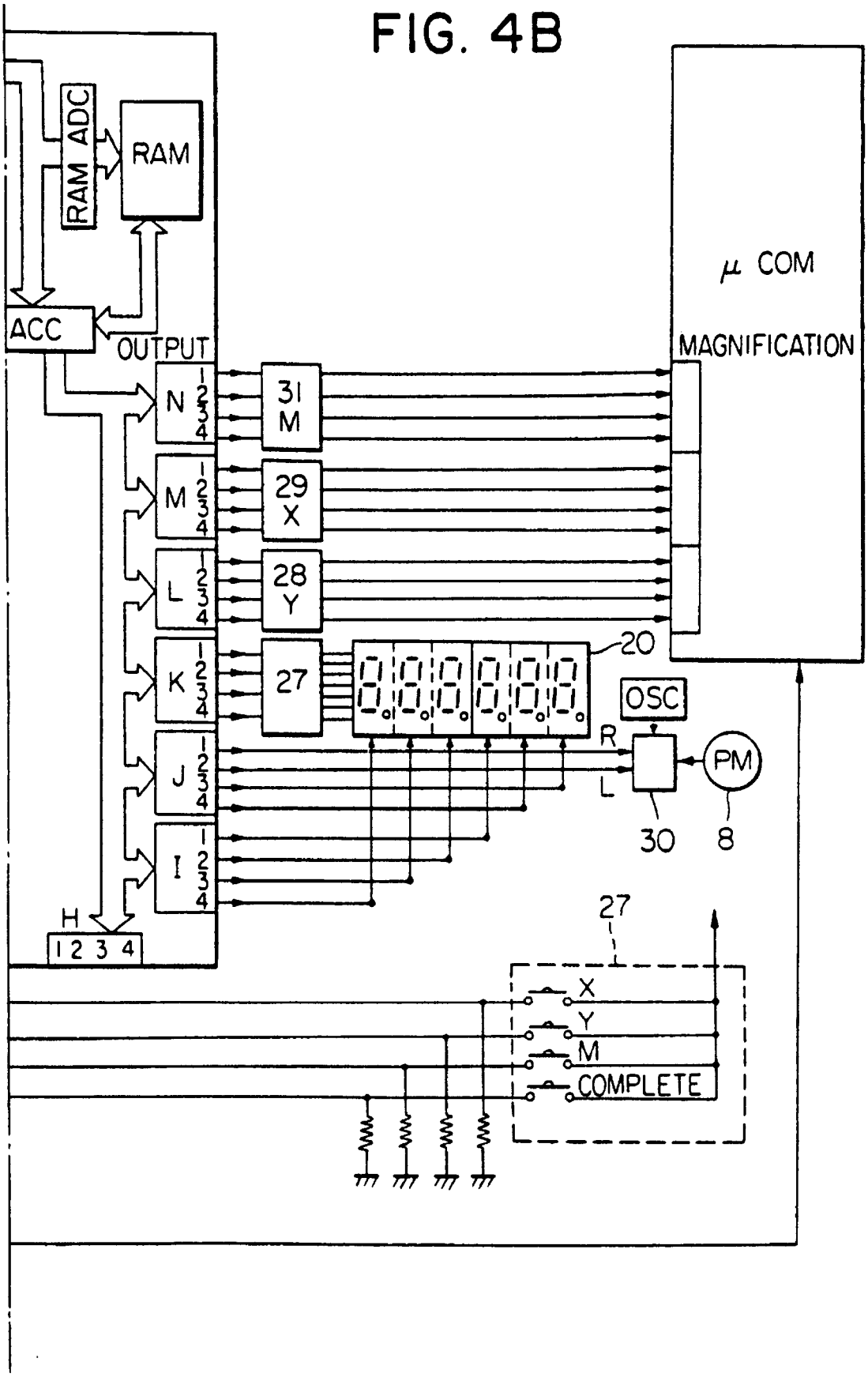

FIG. 4 shows a detailed circuit diagram of FIG. 3, particularly, an internal configuration of the μCOM 19 which is a principal element of the present embodiment. The μCOM 19 may be a well-known one-chip microcomputer such as NEC μCOM 43N. It is 4-bit organized in input ports A–G. It can read data bit by bit and 4 bits in parallel. Each bit is binary weighted, that is, $A_1$, $A_2$, $A_3$ and $A_4$ are weighed by 1, 2, 4, and 8, respectively. Output ports H–N are also 4-bit organized and they can be set to "1" or reset to "0" bit by bit and 4-bits in parallel. They are of latch type structure. Loads are applied to those input/output ports to process the data under program control. The 9-bit A/D converter 18X is coupled to the ports A, B and $C_1$, and it converts an analog voltage generated by the potentiometer 17X to a digital signal. The 9-bit digital signal can represent 512 (in decimal notation) states. Thus, when one bit is allocated to one millimeter, the original size up to 512 mm can be read with a resolution of 1 mm. Similarly, a 9-bit A/D converter 18Y is coupled to the ports D, E and $C_4$ and it reads the original size in the Y direction by an output from a potentiometer 17Y. Again, one bit is allocated to one millimeter.

A photo-interrupter (PI) 23 for generating a position pulse for sensing the position of the magnifying optical system is coupled to the port $C_2$ to determine the position of the optical system. The PI 23 produces a signal by a disc which produces a pulse in response to the movement of the optical system. For example, if a magnification in the X direction or the Y direction is 0.5, the disc rotates counter clockwise to produce pulses at a rate of 50 PCS. If the magnification is 1.5 in the X direction or the Y direction, the disc rotates dockwise to produce pulses at a rate of 50 PCS.

A size of the selected paper is supplied in a coded form to the port G. The code is selected as shown in FIG. 15. Numeral 26 denotes a hexadecimal to quadry encoder.

Control switches (SW) 27 are coupled to the port F. The switch X is a switch for instructing to read the original size in the X direction. When it is depressed, a high level signal "H" is applied to the port $F_4$ to instruct the data from the potentiometer 17X and the A/D converter 18X. The switch Y similarly instructs to read original size in the Y direction. The switch M instructs to calculate the magnification and set the magnifying, system in accordance with the calculated magnification. The switch COMPLETE instructs to supply the original size and the calculated magnification to the μCOM 22 of the copying machine. Those data to be processed by the μCOM 19 which can be shared by the μCOM 22 are supplied to the μCOM 22. The μCOM 22 may be NECμPD8085AC(CPU), μPD8212C(I/0 port), μPD8155P(CAM) and μPD2364(ROM). The SW 27 is operated in the sequence of X or Y, M and COMPLETE.

Figure 13:
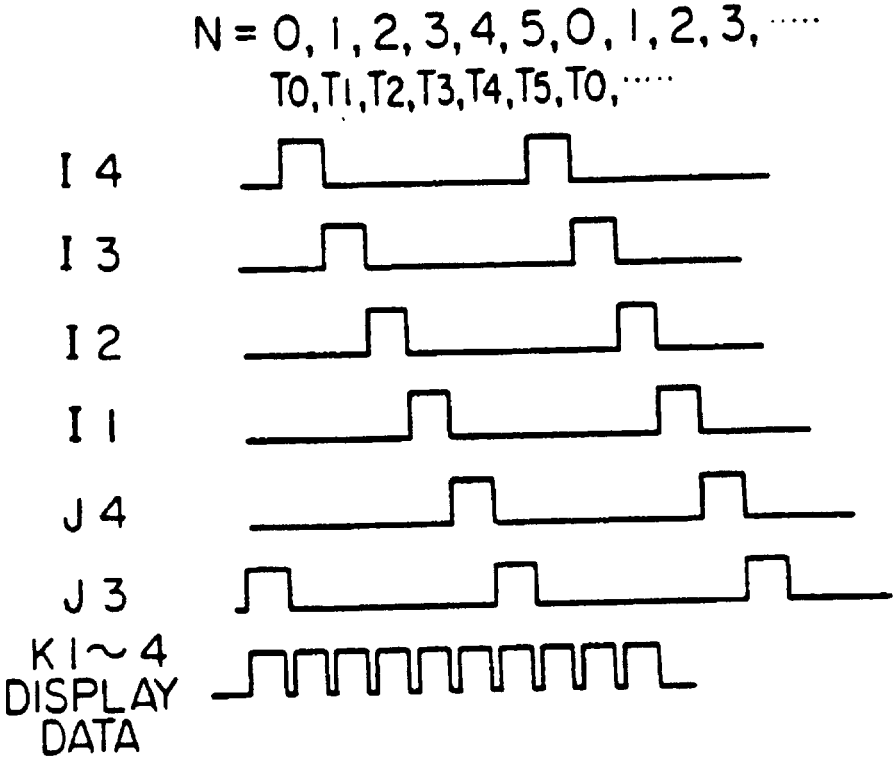
FIG. 13 shows a display timing chart.

The ports I and $J_3$ and $J_4$ produce signals as shown in FIG. 13 which are timing signals for dynamically activating a display 20.

The port K produces a data for the display 20 as shown in FIG. 13.

Figure 14:
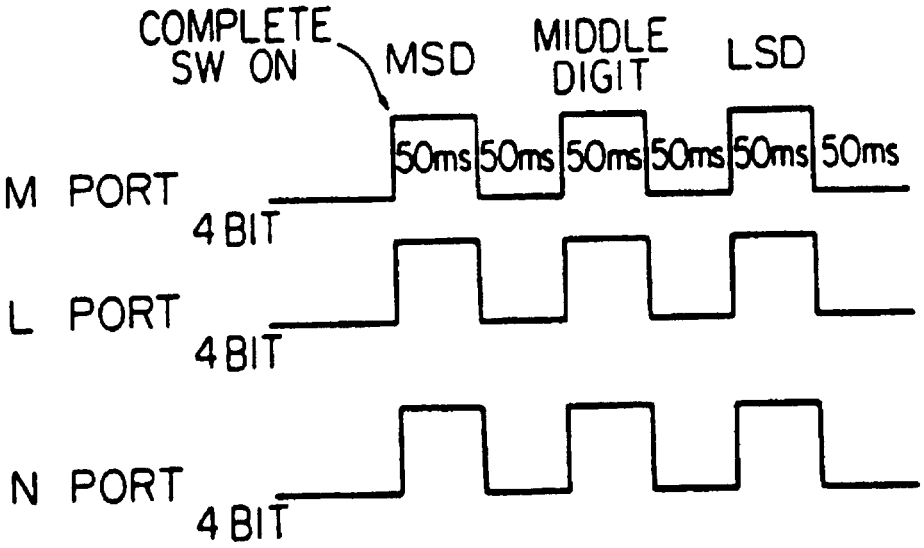
FIG. 14 shows a time chart for indicating a size of an original and a magnification to the copying machine.

The ports $J_1$ and $J_2$ produce signals for moving the optical system to a selected position by the pulse motor 8. The port $J_1$ produces the signal for clockwise rotation R and the port $J_2$ produces the signal for counter clockwise rotation L. Those signals are supplied to a pulse motor drive circuit 30. OSC is connected to the pulse motor drive circuit 30 to determine a drive frequency of the pulse motor 8. (While the pulse motor is shown in the illustrated embodiment, any reversible motor can be used. A unidirectional drive motor (pulse motor) may be used depending on a particular drive system.). The port N sends the magnffication signal M in three-digit number in the sequence of the most significant digit to the least significant digit as shown in FIG. 14. The ports M and L parallelly send the original size signals X and Y in the same format as the magnification signal M. A photo-interrupter (PI) 24 detects a unity-magnification position (1:1 position). Numeral 27 denotes a driver and numerals 28, 29 and 31 denote transistor arrays.

Figure 5:
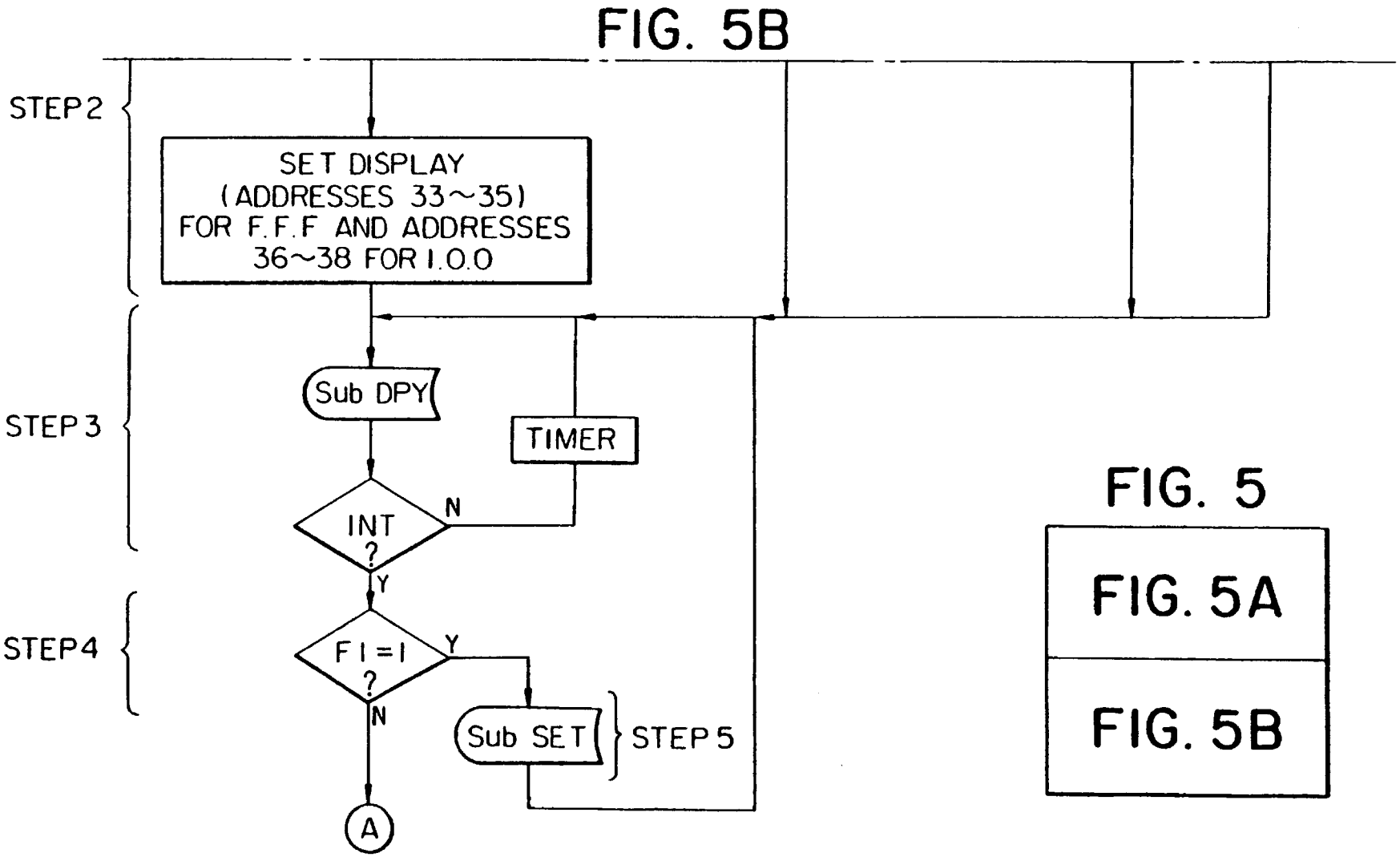
FIG. 5 composed of FIGS. 5A and 5B [show] *shows* a flow chart for an embodiment of the present invention.
Figure 5A:
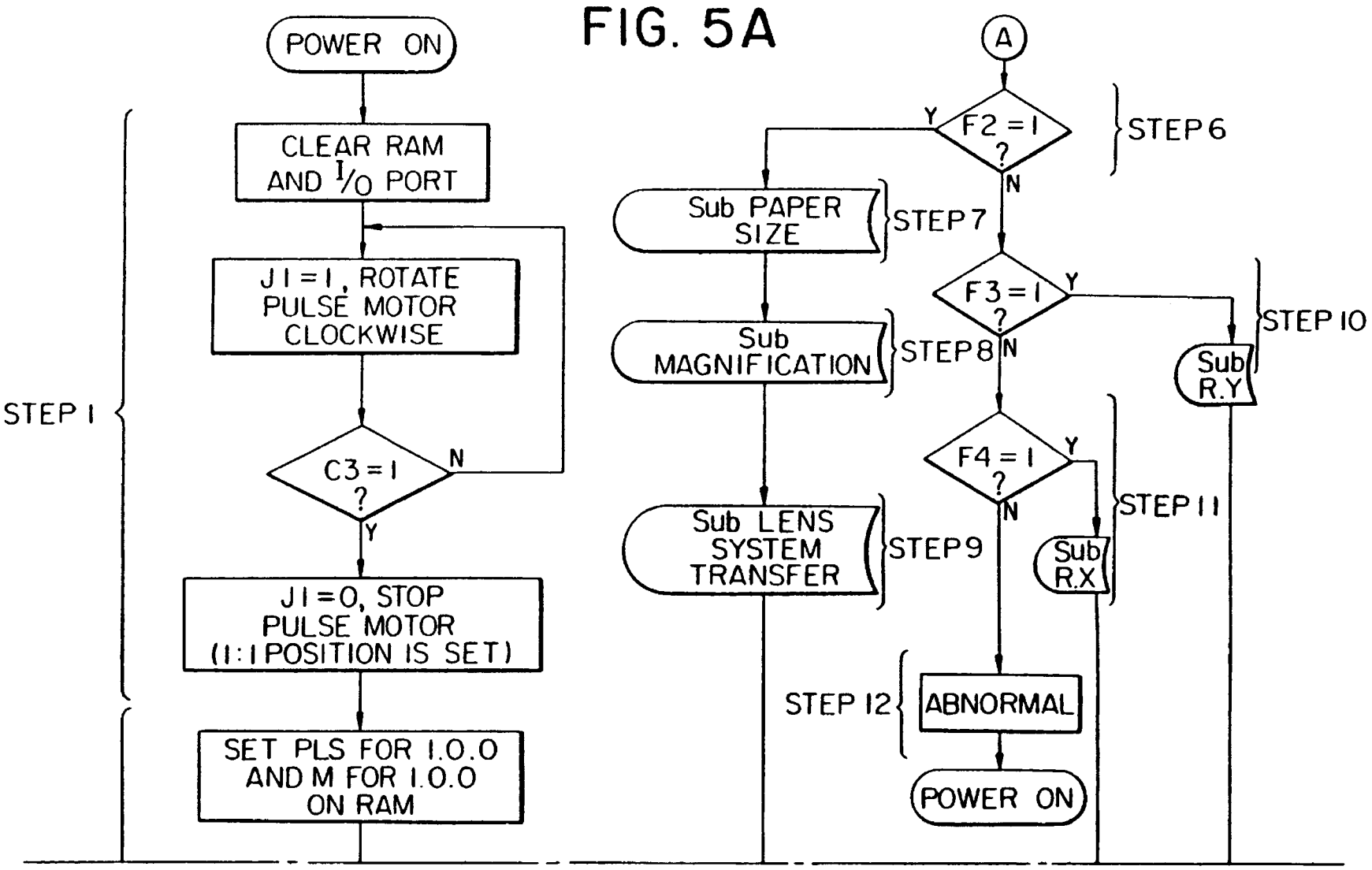

Flow charts shown in FIG. 5 et seq are now explained. In a step 4, a power switch is turned on, the content of the RAM is cleared and the signals at the I/O ports are reset. Then, the pulse motor 8 is driven to detect the unity-magnification position by the PI sensor 24. The signal at the port $C_3$ is read to set the optical system to the unity-magnification position. Then the pulse motor 8 is turned off.

In a step 2, the data are written in the RAM of 4-bit: configuration. As shown in FIG. 12, a 3-digit decimal number representing the X direction original size is written in addresses 1 to 3 in 12 bits. It is designated by X. In the step 1, the content of X is 0. 0. 0 (initial value) because the data has not been written. Similarly, the Y direction original size are written in addresses 4–6 as three-digit data Y. Addresses 25–27 are reserved for storing a digital signal representing the lens position. It is designated by PLS. The content of PLS is 1.0.0 for the unity-magnification position. When the magnification is 0.70, the content of PLS is 0.7.0 after 30 pulses have been applied, and when the magnification is 1.41, the content of PLS is 1.4.1 and the original is magnified to the double after 41 pulses have been applied. Addresses 28–30 of the RAM stores the desired magnification in three digits. It is designated by M. In the step 2, M is 1.0.0.

Addresses 33–35 and 36–38 (display RAM) store 3-digit display data, respectively. In the step 2, data F.F.F and 1.0.0 are initially set. Each segment decoder driver in display does not light on by the input data F. In a step 3, the data of the display RAM is processed in a sub-routine "sub DPY" to display b.b.b, 1.0.0 on the display 20 (b denotes a blank) to indicate the setting of the optical system at the unity-magnification position. Normally, the display 20 displays at a timing shown in FIG. 13. When either the switch X or the switch Y of the SW 27 is depressed, an interrupt signal is applied to an interrupt terminal INT of the μCOM 19 and the process goes to a step 4.

In the step 4, it is checked if the port $F_1$ [if] *is* "1", that is, if the switch COMPLETE has been depressed. If the decision is YES, the process goes to a step 5 where a sub-routine "sub SET" for supplying the data to the μCOM 22 is executed, and the process then goes back to the step 3. The "sub SET" for subroutine will be described later.

If the decision in the step 4 is NO, the process goes to a step 6 where it is checked if the port $F_2$ is "1", that is, if the switch M has been depressed. If the decision is YES, the process goes to a step 7 where the size of the paper loaded to the copying machine is sensed and the paper size data in the X direction is stored at the addresses 9–11 of the RAM in three digit decimal number and the paper size data in the Y direction is stored at the addresses 12–14 in three-digit decimal number. In a step 8, the magnification is calculated and x/X is stored at the addresses 17–19 of the RAM in three-digit number and y/Y is stored at the addresses 20–22 in three-digit number, and the values x/X and y/Y are compared and the smaller one is stored as M at the addresses 28–30 in the three-digit number. Then, the process goes to a step 9.

In the step 9, the number of drive pulses is determined in accordance with the calculated magnification and the optical system is moved to the desired position. At the end of the movement, the display RAM is set to display the selected magnification. As a result, b.b.b and N.N.N (selected magnifigation) are displayed in the step 3.

If the port $F_2$ is not "1" in the step 6, the process goes to a step 10 where it is checked if the switch Y has been depressed[. If the decision is YES, it is checked], *that is,* if the port $F_3$ is "1". If the decision is YES, a sub-routine "sub R. Y" is executed to read the Y coordinate and store it at the addresses 4–6 (Y) of the RAM in three-digit number.

If the port $F_3$ is not "1", the process goes to a step 11 where it is checked if the port $F_4$ is "1", that is, if the switch X-has been depressed. If the decision is YES, the X coordinate is read and it is stored at the addresses 1–3 (X) of the RAM in three-digit number.

If the port $F_4$ is not "1", it-means that an interrupt request has been issued without valid reason. This is not to occur and indicates that some error has occurred. Since it may be caused by some malfunction, the process is retried from the initialization step.

Figures 6, 6A, 6B:
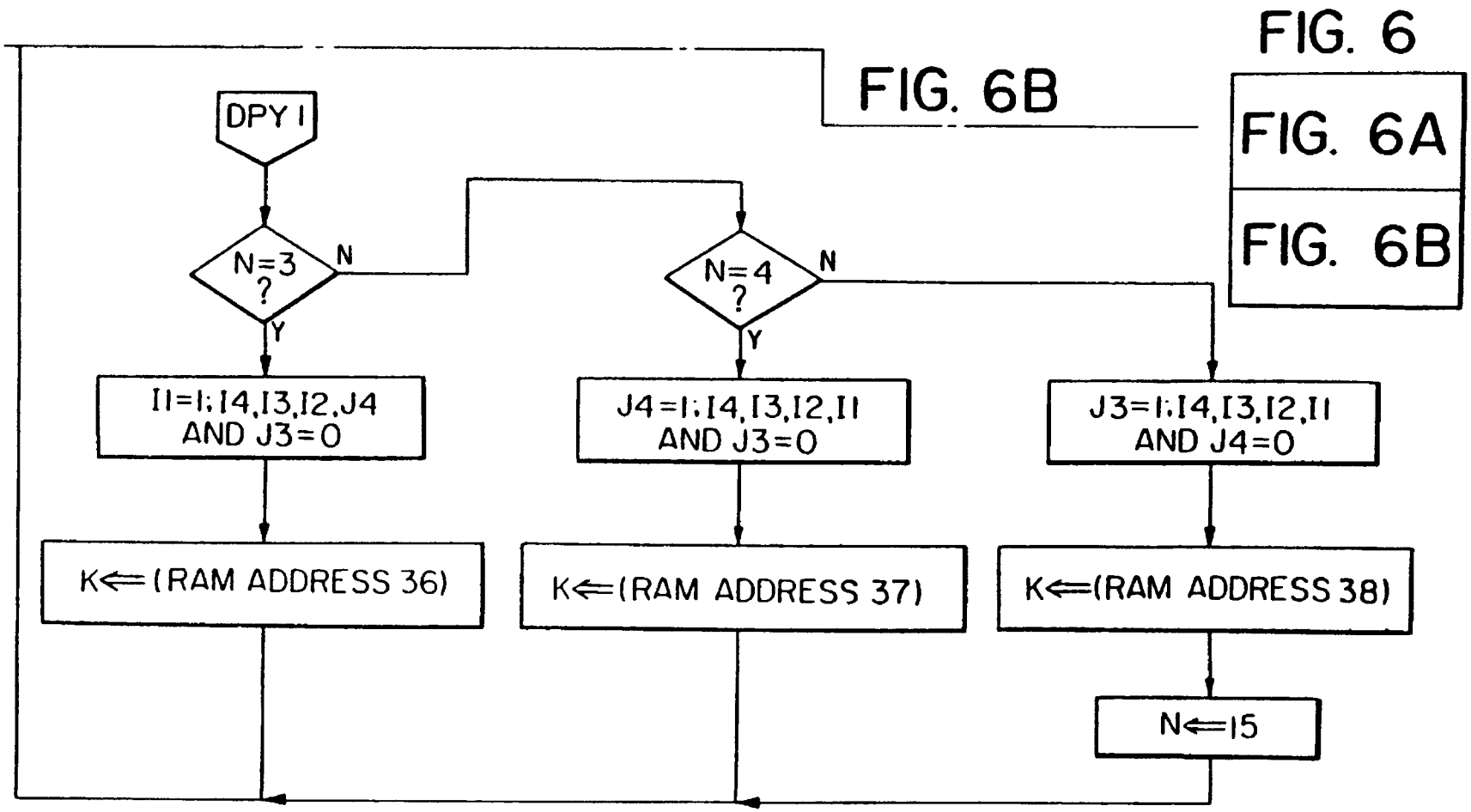
FIGS. 6–11 show sub-routine flow charts.
Figure 6A:
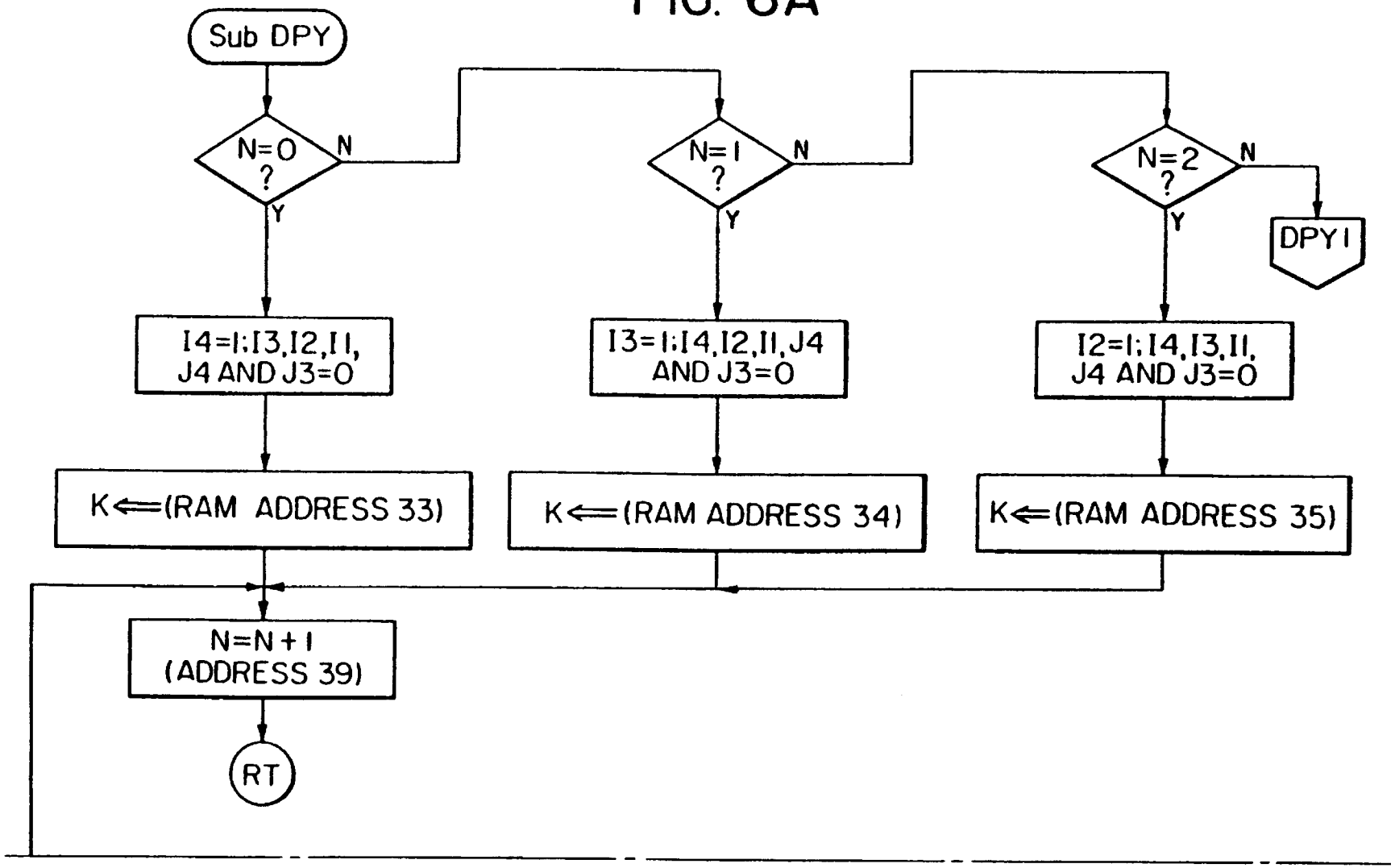

FIG. 6 shows a display sub-routine "sub DPY". N is counted from 0 to 4 at the address 39 of the RAM to control the output of the ports I and J. At N=0, a signal $T_0$ is produced at the port $I_4$ and the data at the address 33 at $T_0$ is supplied to the port K. A most significant digit is displayed by the outputs of the ports $I_4$ and K. At N= 1, a digit is displayed by the port $I_3$ and K, and at N=4, the least significant digit is displayed by the ports $J_3$ and K, and the process goes back to N=0. This process is repeated to produce the timing signal shown in FIG. 13.

Figure 7:
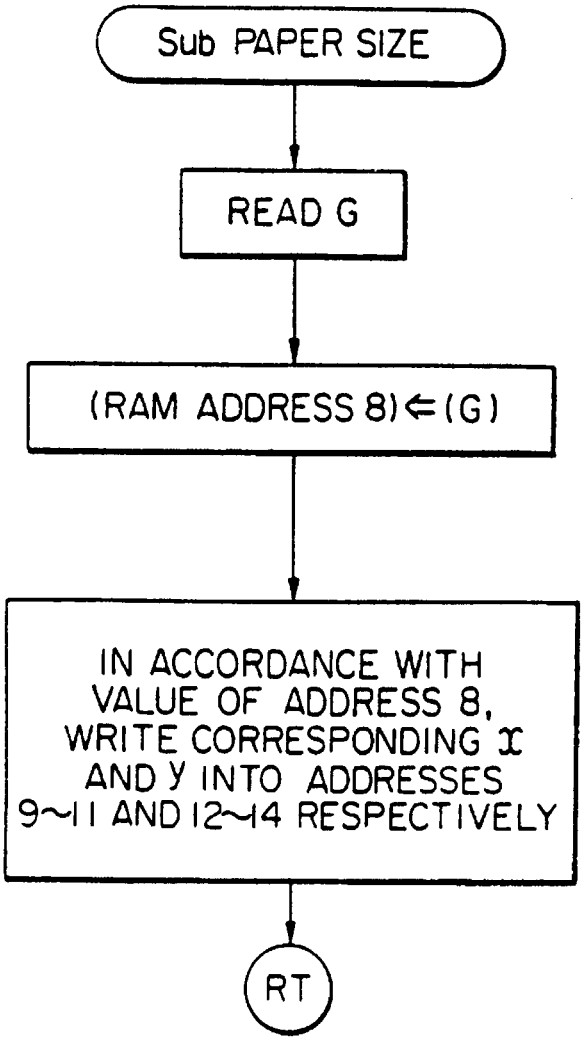

FIG. 7 shows a sub-routine "sub PAPER SIZE" for writing the paper size. A coded signal (paper size code table shown in FIG. 15) at the port G is read and it is written in the address 8 of the RAM. If the content is code 0, it indicates that size $A_3$ [papers are] *paper is* loaded longitudinally.

Thus, "297" is written in the addresses 9–11 (x) of a paper size memory area, and "420" is written in the addresses 12–14 (y) . The RAM shown in FIG. 12 is illustrated for code 6 which indicates size A4 [papers]*paper* loaded laterally.

Figure 8:
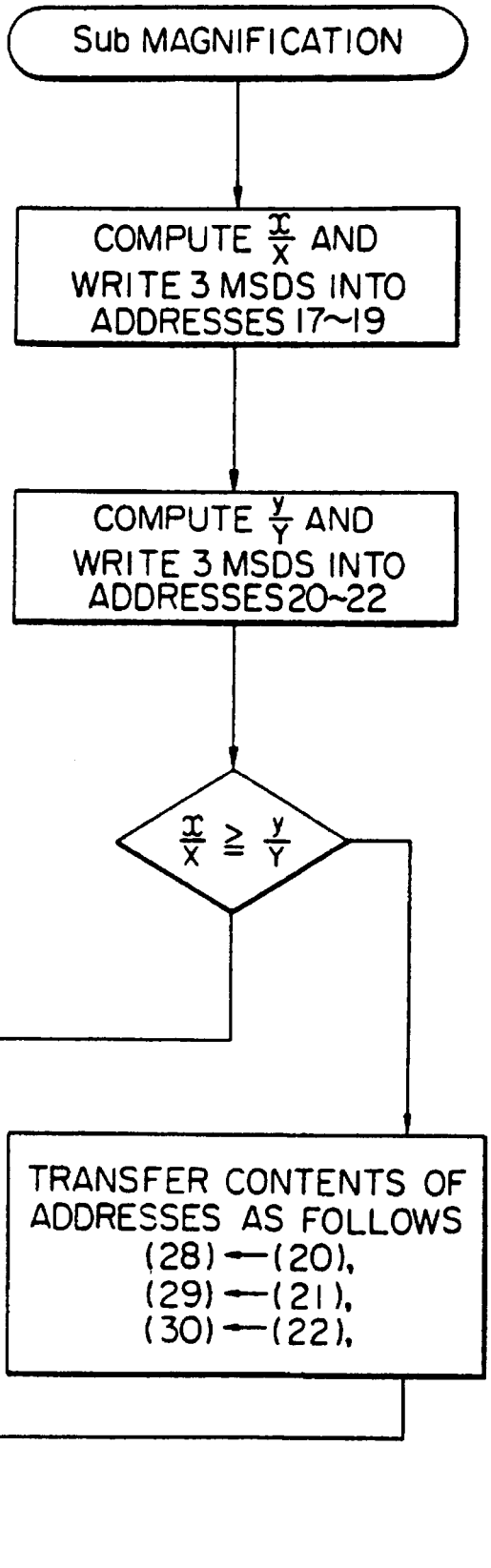

FIG. 8 shows a sub-routine "sub MAGNIFICATION". In this sub-routine, ratios of the respective sides, that is, x/X and y/Y are calculated to allow the inclusion of the entire image of the original in the copy paper, based on the original size X,Y and the paper size x, y stored in the RAM. In the example shown in FIG. 12, X=420 mm, Y=297 mm, x=297 mm and y=210 mm, and hence x/X and y/Y are 0.70. Thus, data 0.7.0 is stored. More precisely, x/X> y/Y. Thus, the ratio y/Y is stored at M of the RAM.

Figure 9B:
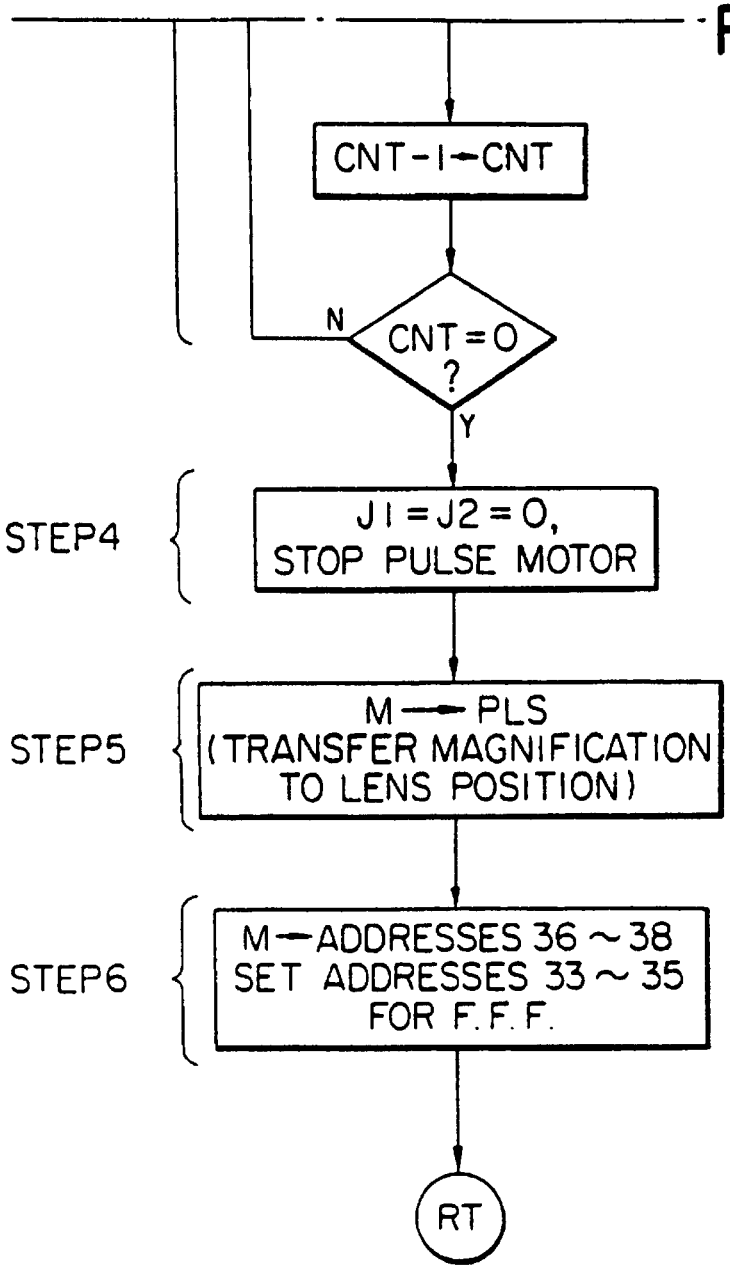
Figure 9:
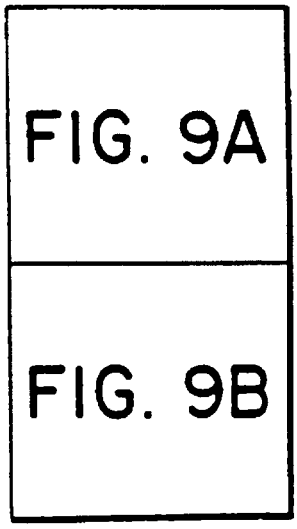
Figure 9A:
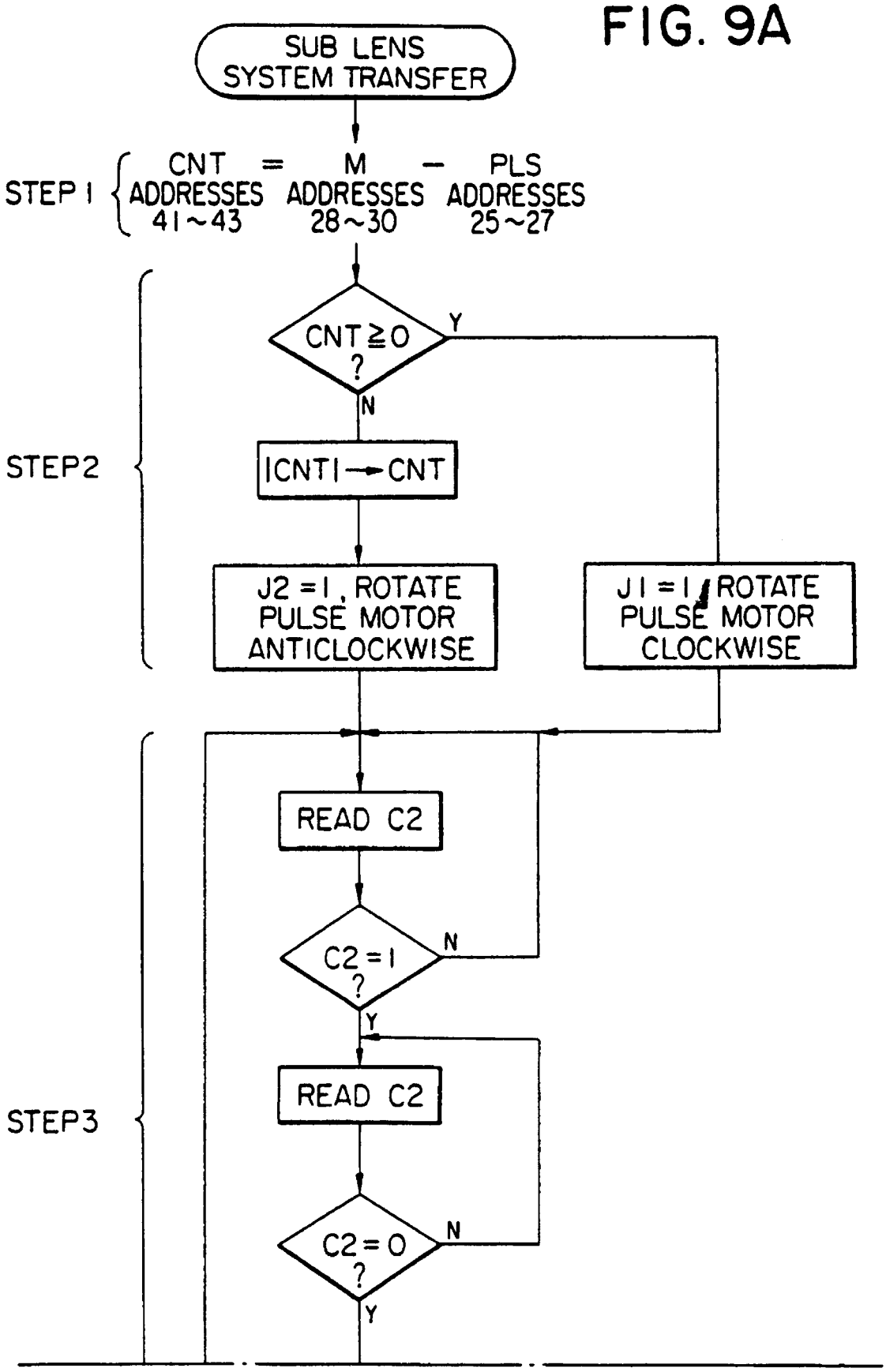

FIG. 9 shows a sub-routine "sub LENS SYSTEM MOVEMENT" for moving the lens system and displaying the magnification. In a step 1, a difference of the content of M subtracted by the content of PLS is written at the addresses 41–43 (CNT) of the RAM 41. In the example shown in FIG. 12, M–PLS=70–100=–30 and hence CNT= –30. In a step 2, it is determined whether the pulse motor 8 is rotated counterclockwise or clockwise depending on whether CNT is positive or negative. If it is positive, the pulse motor 8 is driven clockwise (enlarging direction) and if it is negative, the pulse motor 8 is driven counterclockwise (reducing direction). If CNT is negative, the pulse motor 8 is driven counterclockwise and an absolute value of CNT is decremented by each pulse supplied from the port $C_2$ at a step 3 until CNT reaches zero, when the pulse motor 8 is stopped at a step 4, and the content of M is transferred to PLS in a step 5 in preparation for the next cycle. Thus, M=0.7.0 and PLS=0.7.0. The process then goes to a step 6.

In the step 6, the magnification data M is transferred to the addresses 36–38, and F.F.F is written at the addresses 33–35 to display b.b.b and N.N.N (magnification).

Figure 10:
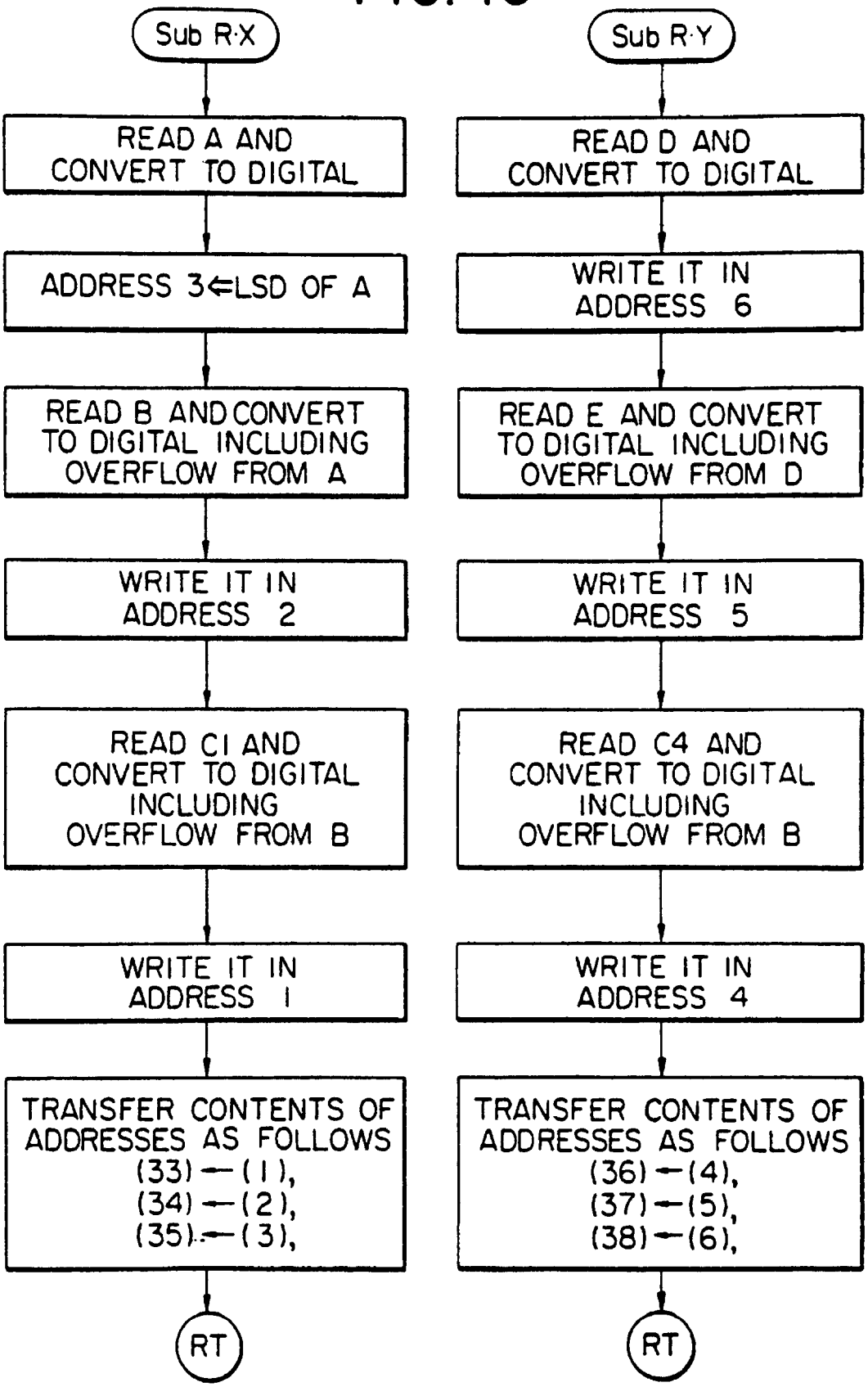

FIG. 10 shows sub-routines "sub R.X" and "sub R.Y". In the sub R.X, a 9-bit A/D convened data is read from the ports A, B and $C_1$, and it is converted to a decimal number, which is then written at X of the RAM in three-digit number. The content of X of the RAM is transferred to the addresses 33–35 for display. In the sub R.Y, a 9-bit A/D converted data is read from the ports D, E and $C_4$ and it is converted to a decimal number, which is then written at Y of the RAM in three-digit number. The content of Y of the RAM is transferred to the addresses 36–38 for display.

Figure 11:
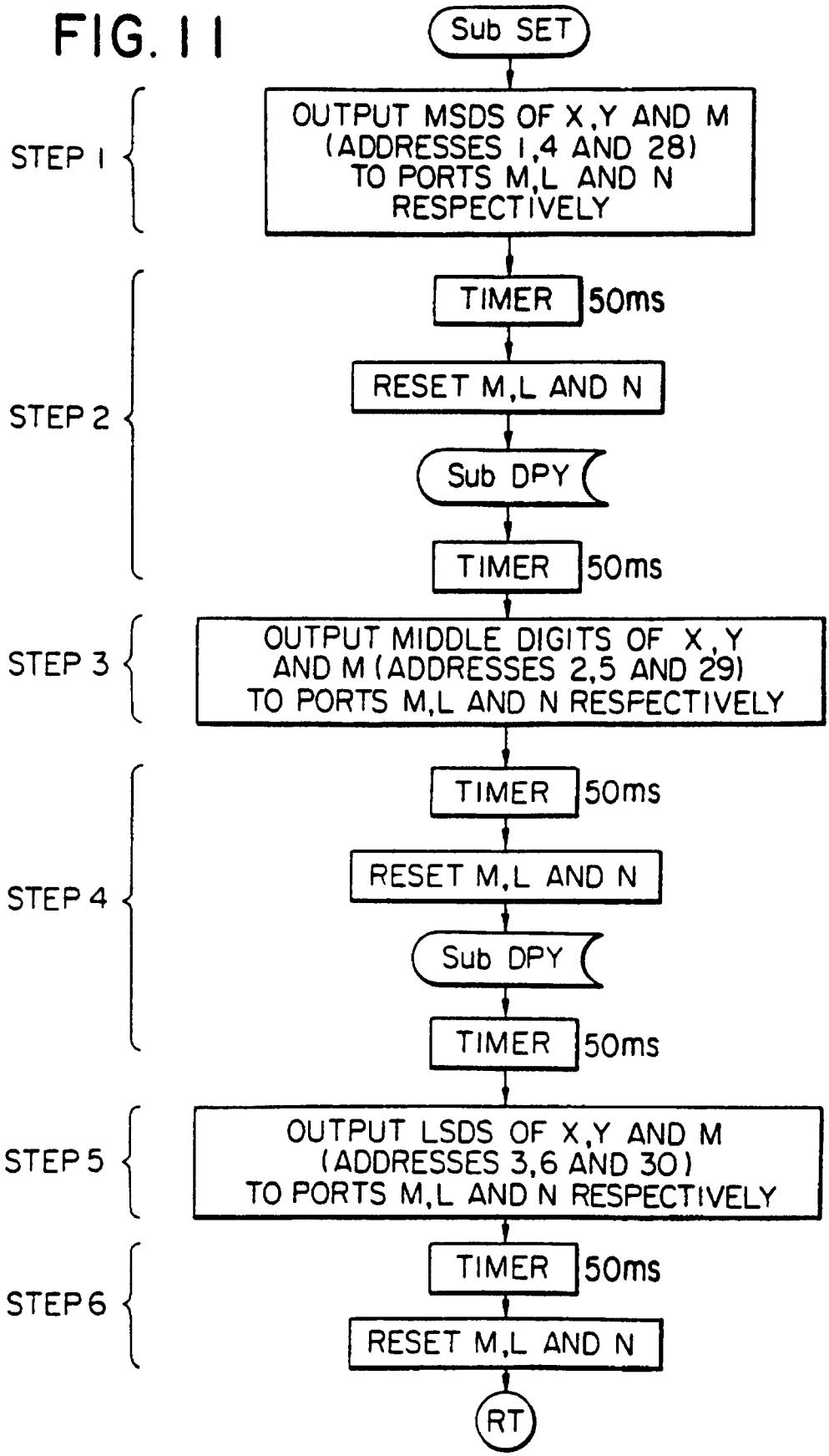

FIG. 11 shows a sub-routine "sub SET". In this subroutine, the original size data X and Y and the magnification data M are supplied to the μCOM 22 in serial and the most significant digit first, as shown in FIG. 14 from the ports M, L and N with three-digit pulses of 50 milliseconds width. The magnification data M is supplied from the port N to the control μCOM 22 of the copying machine to determine a scan speed.

In a step 1, the most significant digits of the original size data X and Y and the magnification data M are read. That is, the content of the address 1 of the RAM is read to the port M, the content of the address 4 of the RAM is read to the port L and the content of the address 28 of the RAM is read to the port N.

In a step 2, after a timer has counted 50 milliseconds, the outputs at the ports M, L and N are reset. The subroutine "sub DPY" is then executed and then the timer again counts 50 milliseconds. In a step 3, the middle digits of the original size data X and Y and the magnification data M are read. That is, the content of the address 2 of the RAM is read to the port M, the content of the address 5 of the RAM is read to the port L and the content of the address 29 of the RAM is read to the port N. In a step 4, after the timer has counted 50 milliseconds, the outputs at the ports M, L and N are reset and the sub-routine "sub DPY" is executed, and then the timer again counts 50 milliseconds. In a step 5, the least significant digits of the original size data X and Y and the magnification data M are read. In a step 6, after the timer has counted 50 milliseconds, the outputs at the ports M, N and L are reset.

In the present embodiment, the magnification factor is automatically determined by determining the original size X and Y and the paper size x and y. When a subroutine shown by a flow chart of FIG. 16 is used in place of the sub-routine "sub MAGNIFICATION" shown in FIG. 8, the magnification factor can be determined based on a longitudinal width or a lateral width of the copy paper.

Figure 16:
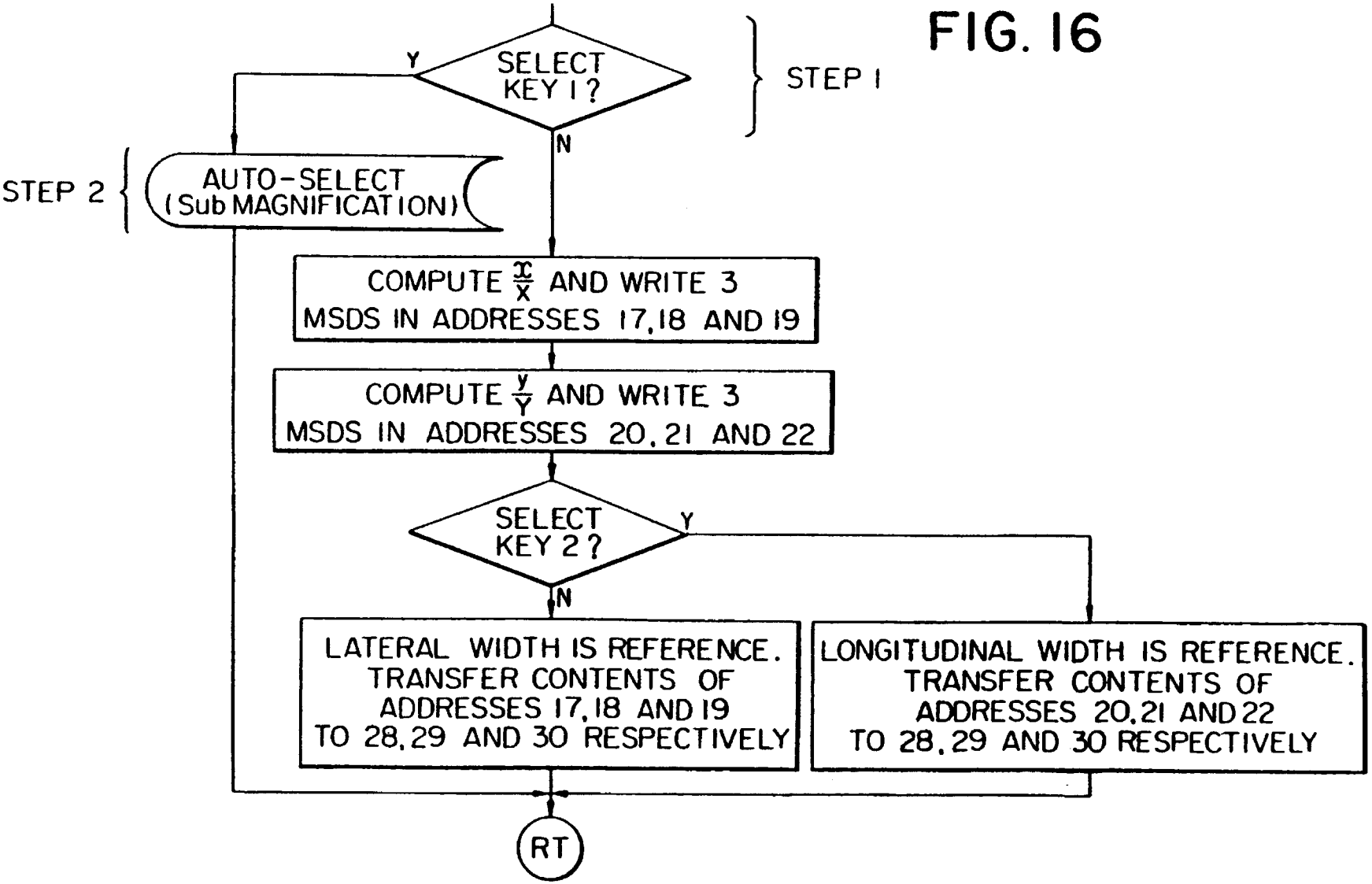
FIG. 16 shows a sub-routine flow chart for explaining a second embodiment of the present invention.

The flow chart of FIG. 16 is now explained in detail. When a select key 1 (not shown) is depressed, a sub-routine "AUTO-SELECT" (corresponding to " sub MAGNIFICATION" in FIG. 8) for automatically selecting a reference width of the paper or a select key 2 (not shown) is selected.

When the AUTO-SELECT is selected, the reference width of the paper is selected based on the original size and the paper size to determine the magnification factor. When the select key 2 is selected, the select key 2 is depressed and the magnification factor is determined based on the longitudinal width or the lateral width of the paper.

When the lateral width is selected as a reference, the ratio y/Y is used as the magnification factor and it is transferred to the addresses 28–30 of the RAM. When the lateral width is selected as a reference, ratio x/X is used as the magnification factor and it is transferred to the addresses 28–30 of the RAM.

Thus, by providing the select key 2, the magnification factor can be selectively determined based on the longitudinal width or the lateral width of the paper.

In the above description, the magnification factor is determined by the original size and the paper size. By providing a switch for selecting a desired magnification factor, a copy of a desired magnification can be produced.

In the second embodiment described above, the longitudinal width and the lateral width are magnified at the same magnification factor. In a third embodiment, ratios of longitudinal sides and lateral sides of the original and the paper are determined and the respective ratios are used as the X direction magnification factor and the Y direction magnification factor so that a non-regular size original can be copied to a regular size paper.

Figure 17:
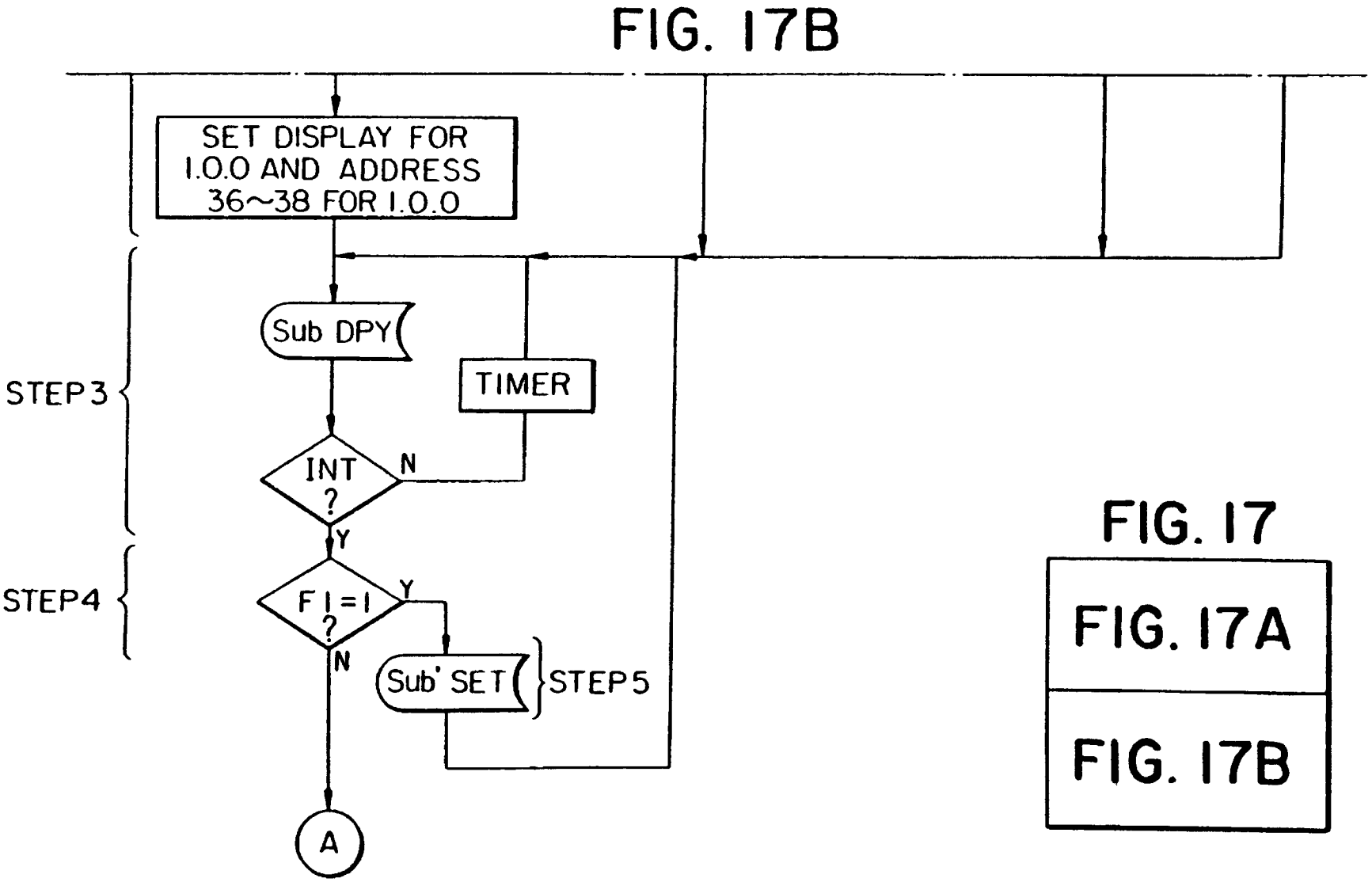
FIG. 17 composed of FIGS. 17A and 17B [show] *shows* a flow chart for explaining a third embodiment of the present invention.
Figure 17A:
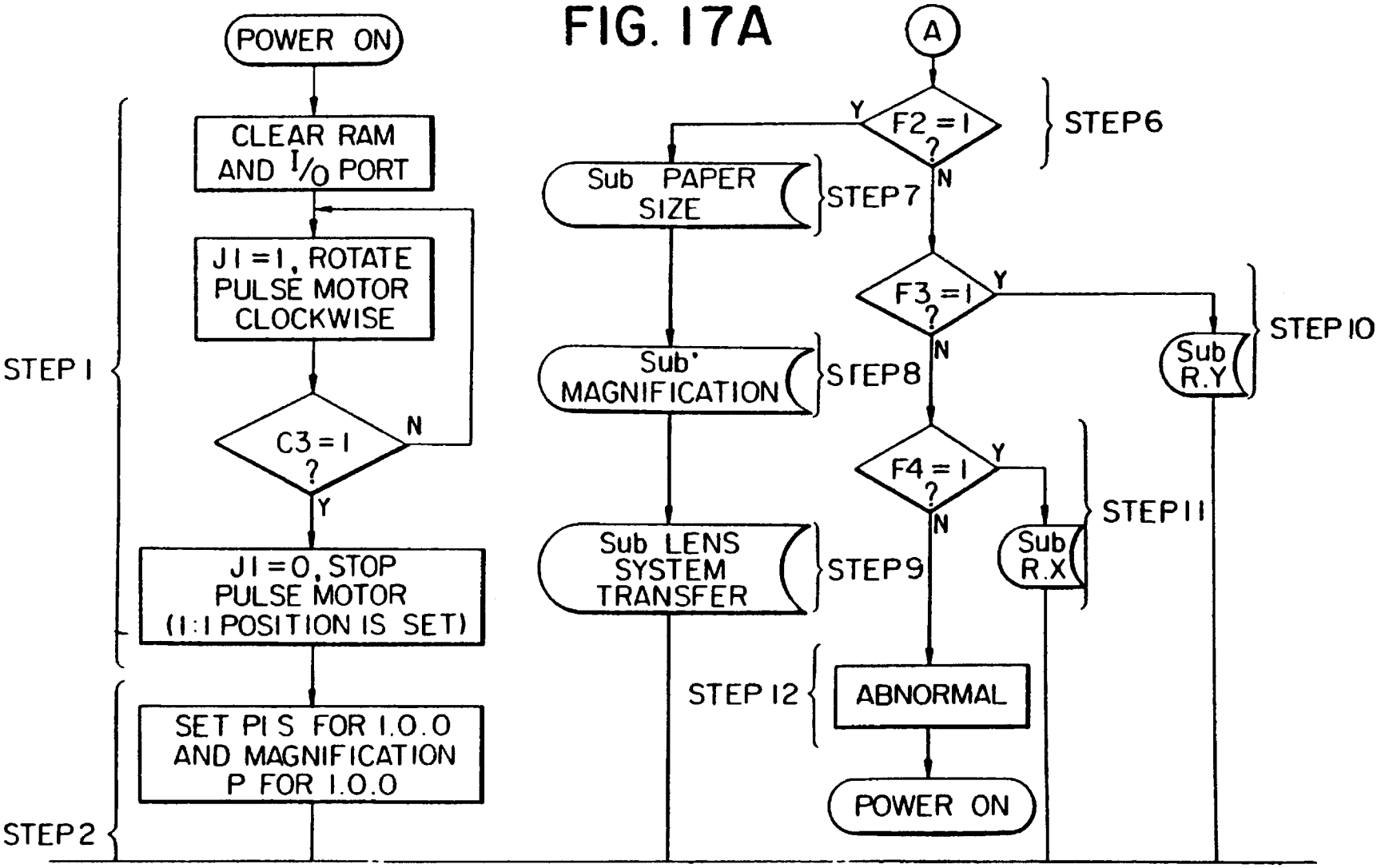

The third embodiment is now explained in detail. The circuit configuration therefor is identical to that shown in FIG. 4 and hence it is omitted here. In a flow chart shown in FIG. 17, a step 1 which is identical to the flow chart of FIG. 5 is executed, and in a step 2 the RAM is set. As shown in a RAM map of FIG. 18, a desired magnification factor in the Y direction is stored in the addresses 28–30 of the RAM in three-digit number. It is designated by P. In the step 2, P= 1.0.0.

Three-digit display data are stored in the addresses 33–35 and the addresses 36–38 (display RAM), respectively. In the step 2, the initial data 1.0.0 and 1.0.0 are set.

In a step 3, the data in the display RAM is processed in the sub-routine "sub DPY" shown in FIG. 6 to display 1.0.0 and 1.0.0 on the display 20 to indicate the setting of the optical system as the unity magnification position. Normally, they are displayed at the timing shown in FIG. 13. When one of the switches X and Y of the SW 27 is depressed, an interrupt signal is supplied to the interrupt terminal INT of the μCOM 19 and the process goes to a step 4.

In the step 4, it is checked if the port $F_1$ is "1", that is, if the switch COMPLETE has been depressed. If the decision is YES, [tne] *the* the processing to a step 5 where a sub-routine "sub' SET" for transferring the data to the μCOM 22 is executed and then the process goes back to the step 3.

Figure 19:
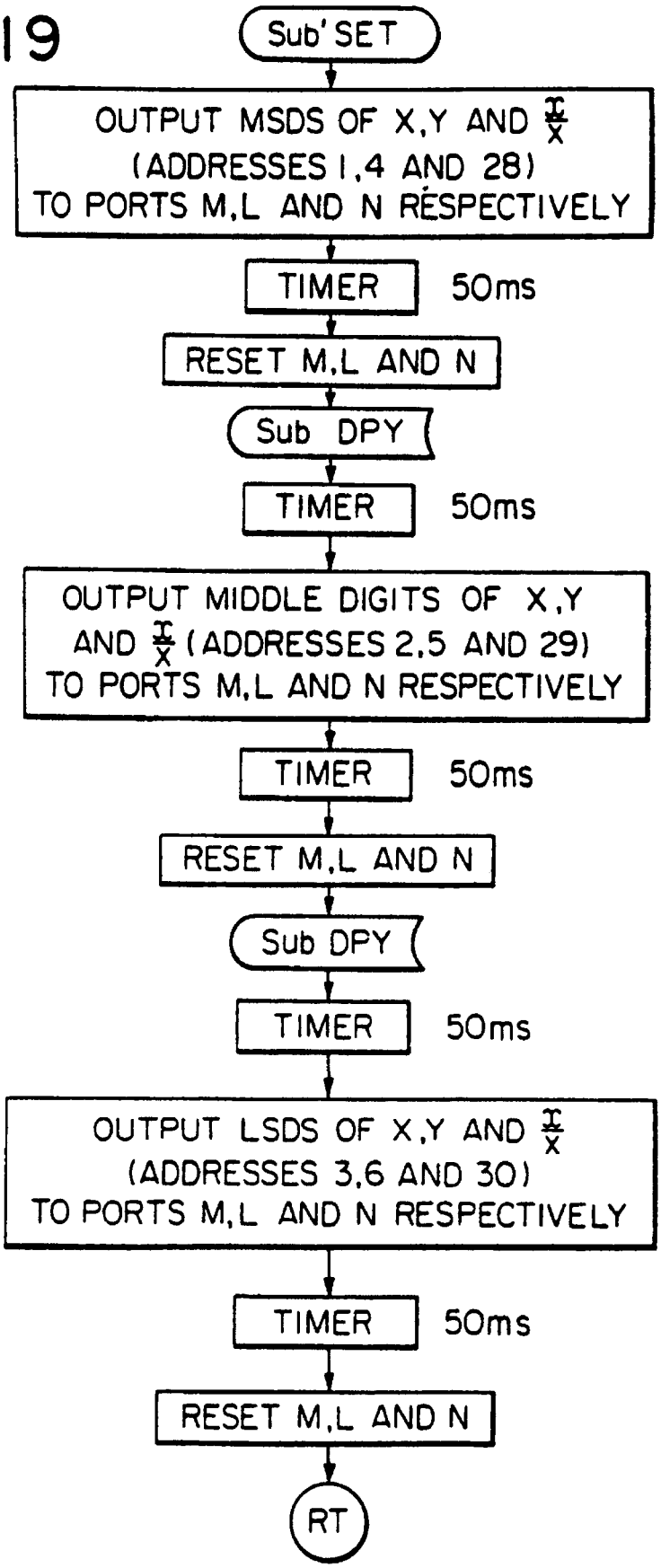
FIGS. 19–21B show sub-routine flow charts.

FIG. 19 shows the sub-routine "sub' SET". In this subroutine, the three-digit data of the original size X and Y and the X direction (scan direction) magnification factor x/X are serially transferred by 50 [milliseconds] *millisecond* pulses, the most significant digit first, as shown in FIG. 14, from the ports M, L and N, respectively. The X direction magnification factor is read as the data for the control μCOM 22 of the copying machine to determine the scan speed.

Figure 20:
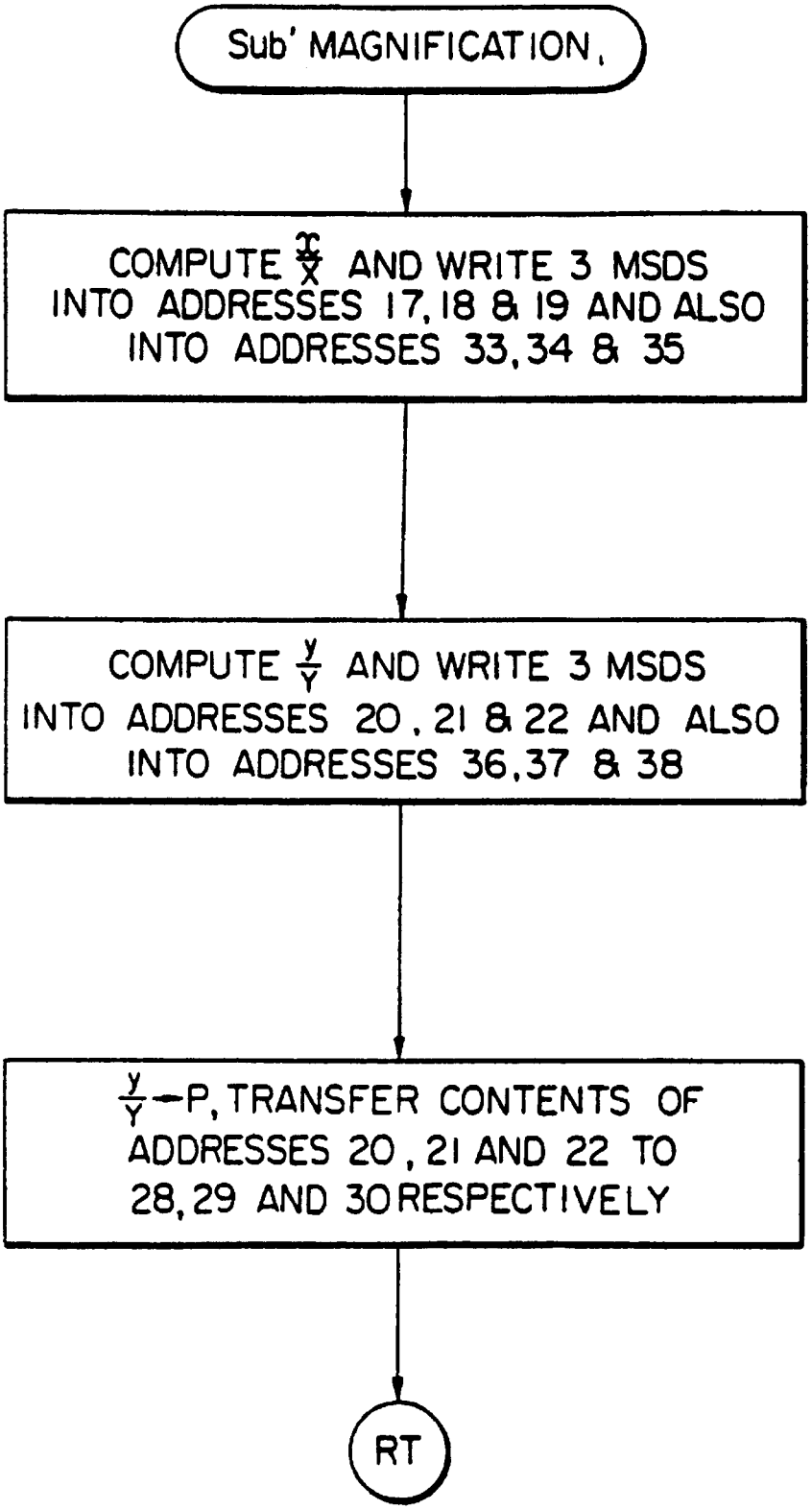

If the switch COMPLETE is not depressed, the process goes to a step 6 where it is checked if the port $F_2$ is "1", that is, if the switch M has been depressed. If the decision is YES, the sub-routine "sub PAPER SIZE" shown in FIG. 7 is executed in a step 7 and the process goes to a step 8. In the step 8, a sub-routine "sub' MAGNIFICATION" shown in FIG. 20. is executed. In this sub-routine the ratios of the sides to allow the copying of the original image on the entire area of the copy paper are determined based on the original size data X and Y and the paper size data x and y. That is, the ratios x/X and y/Y are calculated to determine the respective magnification factors, which are then stored in the RAM. In the example of FIG. 18, X= 420 mm, Y=297 mm, x=297 mm and y=210 mm and hence the ratios x/X and y/Y are 0.70. Thus, 0.7.0 is stored in the RAM. The ratio y/Y is transferred to P of the RAM. The ratio x/X in three-digit number is written in the addresses 17–19 and the addresses 33–35 of the RAM, and ratio y/Y in three-digit number is written in the addresses 20–22 and the addresses 36–38 of the RAM. The Y direction magnification factor y/Y in three-digit number is further written in the addresses 28–30 (P).

After the sub-routine "sub' MAGNIFICATION" has been executed in the step 8, the process goes to a step 9.

In the step 9, the number of drive pulses is determined based on the calculated magnification factors to move the optical system to the desired position. After the movement, the display RAM is set to display the selected magnification factors. Thus, Nx.Nx.Nx and Ny.Ny.Ny (where Nx is the X direction magnification factor and Ny is the Y direction magnification factor) are displayed on the display 20.

Figure 21B:
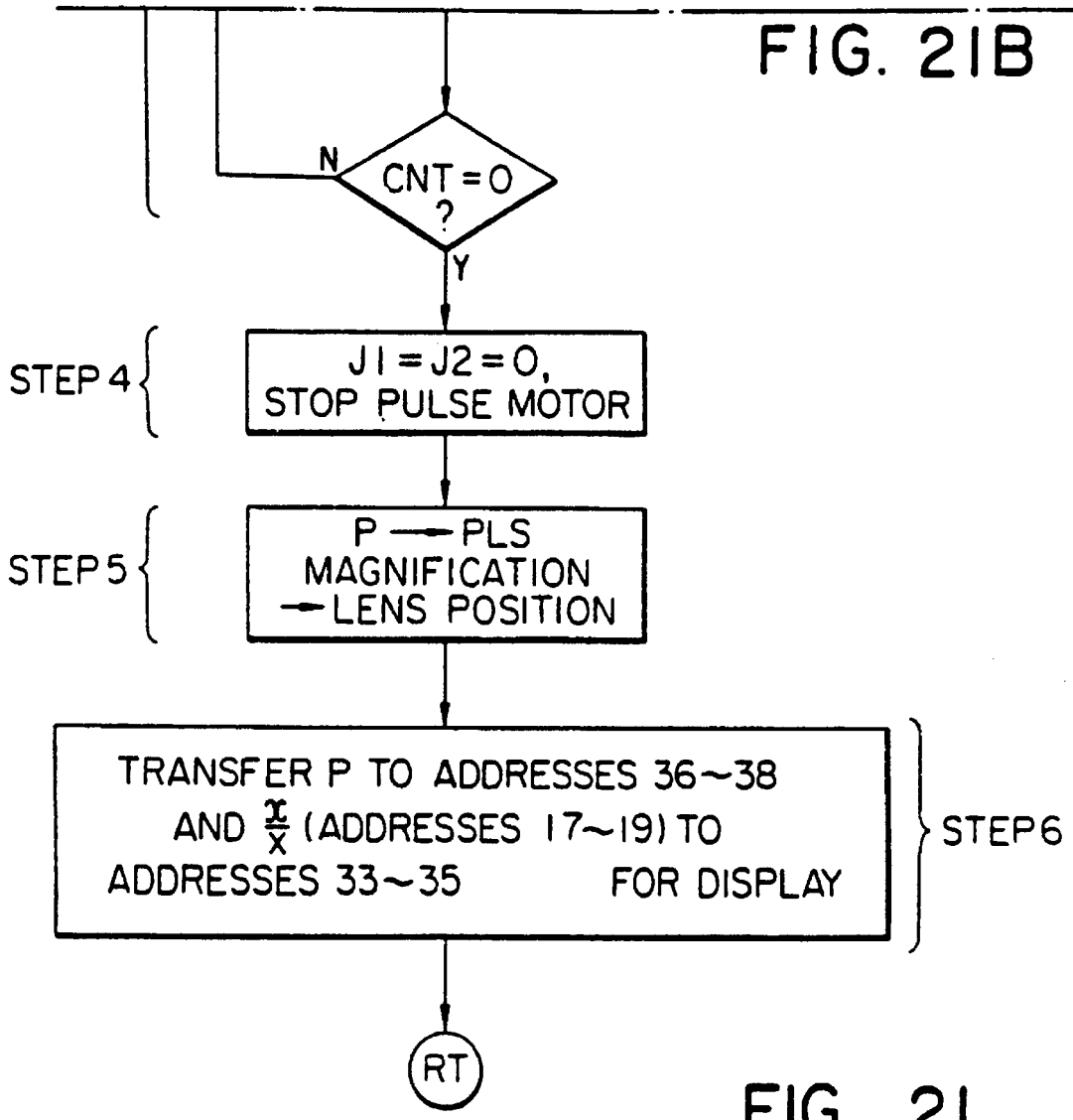
Figure 21:
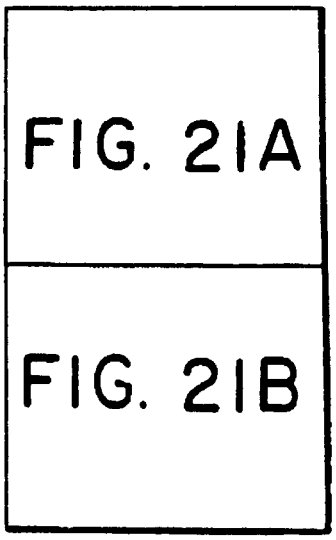
Figure 21A:
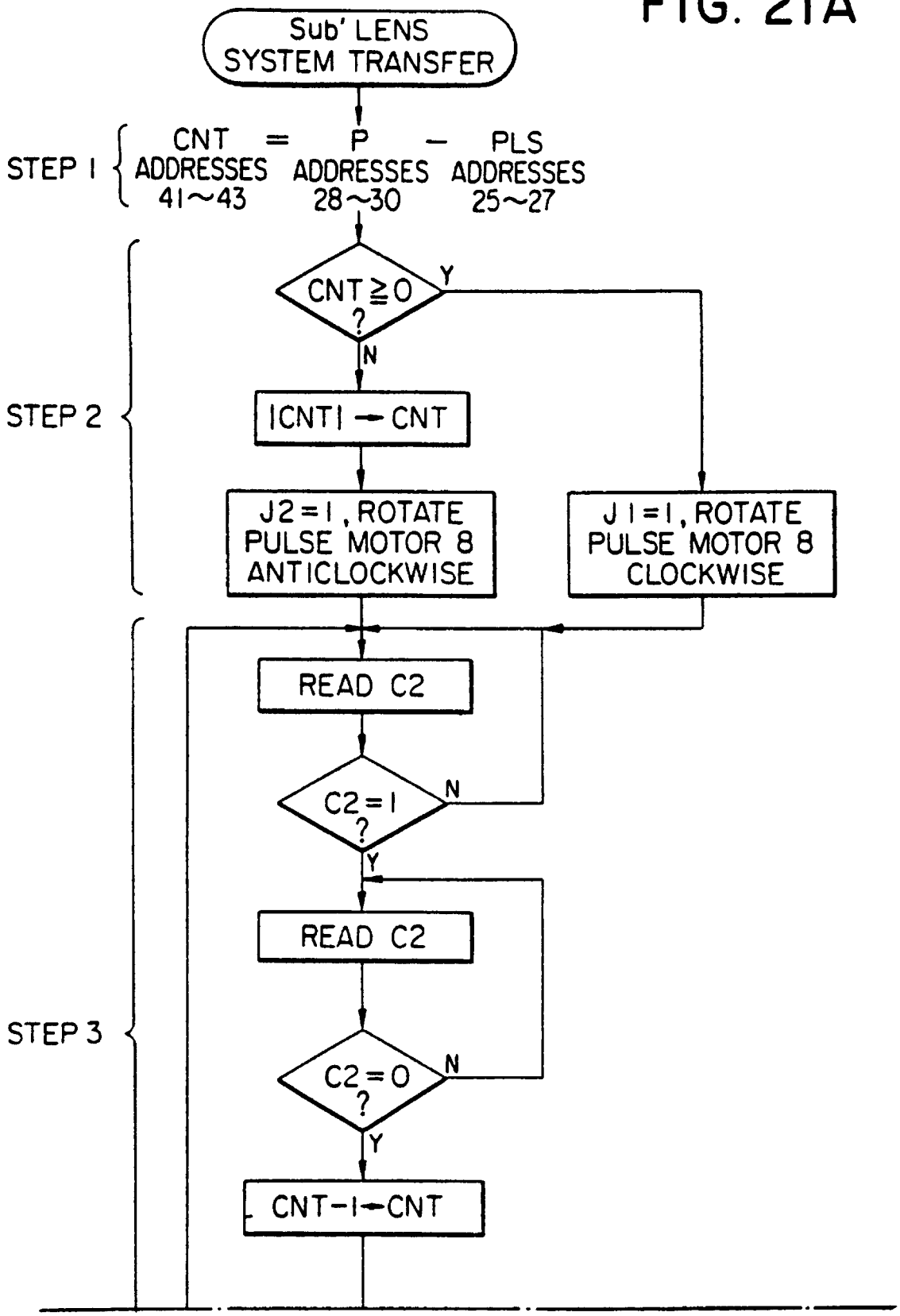

FIG. 21 shows a sub-routine "sub' LENS SYSTEM MOVEMENT"[.] for moving the lens system and displaying the magnification factors, which is executed in the step 9, is shown. In a step 1, a difference of the content of P subtracted by the content of PLS is written in the addresses 41–43 (CNT) of the RAM. In the example of FIG. 18, PLS= 70–100=–30 and hence CNT= –30. In a step 2, it is determined whether the pulse motor 8 is rotated counterclockwise or clockwise depending on whether CNT is positive or negative. If CNT is positive, the pulse motor 8 is rotated clockwise (enlarging direction), and if CNT is negative, the pulse motor 8 is rotated counterclockwise (reducing direction). If the CNT is negative, the pulse motor 8 is rotated counterclockwise and an absolute value of the CNT is decremented by each pulse supplied from the port $C_2$ in a step 3 until the CNT reaches zero, when the pulse motor 8 is stopped in a step 4 and the content of P is transferred to PLS in preparation for the next cycle. Thus, P=0.7.0, and PLS=0.7.0. In a step 6, the value M is written in the addresses 36–38 for displaying the Y direction magnification factor, and the ratio x/X, that is, the content of the addresses 17–19 is written in the addresses 33–35 for displaying the X direction magnification factor. Thus, the magnification factors Nx.Nx.Nx and Ny.Ny.Ny are displayed.

The other steps are identical to the flow chart shown in FIG. 5 and hence they are not explained here.

In the present embodiment, the magnification factors in the lateral direction and the longitudinal direction are separately calculated. By providing switches for selecting desired longitudinal and lateral magnification factors, a copy of a desired magnification can be formed.

In any of the above [embodiment] *embodiments*, the rotational speed of the photosensitive drum may be varied in accordance with the magnification factor in the scan direction with the scan speed being fixed.

In any of the above embodiments, when the pulse motor is used, the clock pulse generator 23 may be omitted. In this case, *the* the necessary number of pulse motor drive pulses may be supplied from the output ports $J_1$ and $J_2$ of the control μCOM 19.

In the present embodiment, the magnification factors in the X direction and the Y direction, that is, x/X and y/Y are displayed. Alternatively, an area magnification factor (x x y)/(X x Y) may be displayed. The magnification data and other data supplied to the μCOM 22 are used to remove the contamination by the toner of an excess area of the drum not used for the magnification copying operation.

In the present embodiment, the original size data is inputted to the μCOM 19 through the potentiometers 18X and 18Y. Alternatively, it may be manually entered by a ten key, or automatically entered by sensors.

As described hereinabove, according to the present invention, the magnification of the copy can be determined based on the longitudinal width or the lateral width of the copy paper. Since the magnification factor need not be calculated for each operation, a non-regular size original can be readily copied to a regular size paper.

In accordance with the present invention, either the. regular size original or the non-regular size original can be copied to the regular size paper. Thus, copies need not be patched and a non-regular size copy is avoided. Since the image is reproduced on the entire area of the copy paper, a non-regular size copy can be reproduced from a non-regular size original. In accordance with the present invention, the original size and the density of the copy can be processed with a small number of input device.

It should be understood that the present invention is not limited to the illustrated embodiments but various modifications thereof can be made within a scope of the appended claims.

What I claim:

1. A variable [magnfication] *magnification* copying machine comprising:

original size input means for inputting a size of an original;

paper size input means for inputting a size of a copy paper; and determination means for determining a magnification factor based on the original size and the paper size, said determination means including first determination means for determining a first magnification factor based on first direction widths of the original and the paper, second determination means for determining a second magnification on second direction widths of the original and the paper, and selection means for [manually] selecting between said first determination means and said second determination means.

2. A variable magnification copying machine according to claim 1, wherein said paper size input means includes means for generating a signal representing a size of mounted copy paper.

3. A variable magnification copying machine according to claim 2, further comprising: display means for displaying the copy magnification factor.

4. A variable magnification copying machine according to claim 1, further comprising measuring means for measuring a distance of movement of an optical system for magnification change in accordance with the determining magnification factor.

5. A variable magnification copying machine according to claim 2, wherein said original size input means includes display means for displaying the width of the original.

6. A variable magnification copying machine comprising:

original size input means for inputting a size of an original;

paper size input means for inputting a size of a copy paper; and determination means for determining a magnification factor based on the original size.and the paper size, said determination means including first determination means for determining a first magnification factor based on first and second direction widths of the original and first and second direction widths of the paper, second determination means for determining a second magnification factor based on first or second direction widths of the original and the paper, and selection means for selecting between said first determination means said second determination means.

7. A variable magnification copying machine according to claim 6, wherein said second determination means includes third determination means for determining a magnification factor based on the first direction widths of the original and the paper, [foruth] *fourth* determination means for determining a magnification factor based on the second direction widths, and reference selection means for selecting between said third determination means and said fourth determination means.

8. A variable magnification copying machine according to claim 6, wherein said paper size input means includes means for generating a signal representing a size of mounted copy paper.

9. A variable magnification copying machine according to claim 8, wherein said original size input means includes display means for displaying the width of the original.

10. A variable magnification copying machine according to claim 9, further comprising:

display means for displaying the original size and the copy magnification factor.

11. A variable magnification copying machine according to claim 6, further comprising measuring means for measuring a distance of movement of an optical system for magnification change in accordance with the determined magnification factor.

12. A variable magnification copying machine comprising:

an original mount member for mounting an original thereon;

reading means for reading a size of the original mounted on said original mount member to generate a reading signal;

A/D [converter] *converting* means for A/D converting the reading signal from said reading means;

paper size signal generating means for generating a paper size signal representing a size of a copy paper; and magnification factor [transfer] *deriving* means for [transferring] *deriving* a magnification factor [derived] *consisting of plural digits* from the paper size signal and the output from said A/D [converter] *converting* means, *wherein said magnification factor deriving means transfers the magnification factor* to a control circuit of an image forming unit *digit by digit* to control a magnification copy operation.

13. A variable magnification copying machine according to claim 12, wherein said magnification factor transfer means a includes first magnification factor based on first direction widths of the original and the paper, second determination means for determining a second magnification factor based on second direction widths of the original and the paper, and selection means for selecting between said first determination means and said second determination means.

14. A variable magnification copying machine according to claim 12, wherein said magnification factor transfer means includes calculation means for calculating magnification factors in the respective direction of the original and the paper.

15. A variable magnification copying machine according to claim 12, further comprising display means for displaying the magnification factor.

16. A variable magnification copying machine comprising:

original size input means for inputting a size of an original;

paper size input means for inputting a size of a copy paper;

determination means for determining a magnification factor based on the original size and the paper size, said determination means including first determination means for determining a first magnification factor based on first direction widths of the original and the paper and second determination means for determining a second magnification factor based on second direction widths of the original and the paper; and control means for controlling an image formation unit [in accordance with] *using both* the first magnification factor determined by said first determination means and the second magnification factor determined by said second determination means.

17. A variable magnification copying machine according to claim 16, wherein said first and second determination means determine the first and second magnification factors, respectively, so as to reproduce the content of the original on an entire surface of the paper.

18. A variable magnification copying machine according to claim 16, wherein said paper size input means includes means for generating a signal representing a size of the mounted paper.

19. A variable magnification copying machine according to claim 18, further comprising display means for displaying the copy magnification factors.

*20. A device for setting a copying magnification in a copying apparatus, said device comprising:*

*a data storage means having a plurality of memory locations;*

*selection key means for selecting one of said plurality of memory locations; and*

*control means for storing a numerical value in one of said memory locations selected by said selection key means, said control means setting an operation mode of said copying apparatus such that a numerical value stored in one of said memory locations selected by said selection key means corresponds to a copying magnification value.*

*21. A device for setting a copying magnification in an electrophotographic copying apparatus, said device comprising:*

*means for manually inputting a numerical value;*

*a data storage means having a plurality of memory locations;*

*selection key means for selecting one of said plurality of memory locations; and*

*control means for storing a numerical value input by said numerical value input means in one of said memory locations selected by said selection key means, said control means setting an operation mode of said copying apparatus such that a numerical value stored in one of said memory locations selected by said selection key means corresponds to a copying magnification value.*

*22. The device as defined in claim 21, further including mode switching means for switching a control mode of said copying apparatus to a copying magnification setting mode wherein said data storage means and said control means are so interconnected that said data storage means is capable of storing said numerical value input by said numerical value input means only in said copying magnification setting mode.*

*23. The device as defined in claim 21, wherein said data storage means comprises a first group of memory locations in which a numerical value corresponding to a predetermined copying magnification is stored in advance and a second group. in which no numerical value is prestored.*

*24. The device as defined in claim 23, further including at least the preset means for presetting a predetermined value in said first group of memory means.*

*25. The device as defined in claim 24, wherein said preset means includes operation means for enabling variable combinations of values to be stored in said memory means.*

*26. The device as defined in claim 21, wherein said selection key means has a plurality of keys, each corresponding respectively to one of said plurality of memory locations.*

*27. The device as defined in claim 21, wherein said numerical value input means further includes operation means for increasing or decreasing the input value.*

*28. A device for setting a copying magnification in an electrophotographic copying apparatus, said device comprising:*

*numerical value varying operation means for increasing or decreasing an input value by a predetermined number;*

*memory means; and*

*control means for storing a value set by said numerical value varying operation means in said memory means, said control means setting an operation mode of said copying apparatus such that said value corresponds to a copying magnification.*

*29. An apparatus for adjusting the magnification setting of a photocopying machine comprising:*

*a magnification/reduction apparatus contained as part of the photocopying machine;*

*a storage means for storing in respective memory locations a plurality of preselected data words indicative of a selected magnification/reduction ratio between the size of an image being copied and the size of the reproduced image;*

*selection means for selecting a respective one of the memory locations;*

*magnification control means for reading the data word stored in the respective selected memory location for adjusting the magnification/reduction apparatus according to the value of the magnification/reduction ratio stored in the respective memory location.*

*30. The apparatus of claim 29, further comprising:*

*input means for modifying the magnification/reduction ratio in a selected one of at least a first plurality of the respective memory locations.*

*31. The apparatus of claim 29 further comprising:*

*the magnification control means includes a microprocessor which provides an output signal to the magnification/reduction apparatus to control the magnification/reduction apparatus in accordance with data representative of a particular magnification/reduction ratio.*

*32. The apparatus of claim 30, further comprising:*

*the storage means containing a second plurality of memory locations in which is stored magnification/reduction ratios;*

*the second plurality of memory locations having associated therewith a selection key, the operation of which serves to load the contents of the second plurality of memory locations into the magnification control means.*

*33. The apparatus of claim 32 further comprising:*

*an input control switch,*

*means responsive to the operation of the input control switch for loading the second plurality of memory locations, including means for alternatively selecting the contents of stored magnification/reduction values in response to a coded input and to input from the input means.*

*34. The apparatus of claim 32, further comprising:*

*a plurality of selection keys, associated with the memory locations, for selecting the contents of the respective memory locations for reading into the control means.*

*35. A device for setting a copying magnification in a copying apparatus, said device comprising:*

*means for manually inputting a numerical value;*

*a data storage means having a plurality of memory locations;*

*selection key means for selecting one of said plurality of memory locations; and*

*control means for storing a numerical value input by said numerical value input means in one of said memory locations selected by said selection key means, said control means setting an operation mode of said copying apparatus such that a numerical value stored in one of said memory locations selected by said selection key means corresponds to a copying magnification value.*

*36. A device for setting a copying magnification in a copying apparatus, said device comprising:*

*means for manually inputting a numerical value;*

*a data storage means having a plurality of memory locations;*

*selection key means for selecting one of said plurality of memory locations; and*

*control means for storing a numerical value input by said numerical value input means in one of said memory locations selected by said selection key means, said control means setting an operation mode of said copying apparatus such that a numerical value stored in one of said memory locations selected by said selection key means is used to set a copying magnification.*

*37. The device as defined in claim 36, further including mode switching means for switching a control mode of said copying apparatus to a copying magnification setting mode wherein said data storage means and said control means are so interconnected that said data storage means is capable of storing said numerical value input by said numerical value input means only in said copying magnification setting mode.*

*38. The device as defined in claim 36, wherein said data storage means comprises a first group of memory locations in which a numerical value used to set a predetermined copying magnification is stored in advance and a second group in which no numerical value is prestored.*

*39. The device as defined in claim 38, further including at least the preset means for presetting a predetermined value in said first group of memory means.*

*40. The device as defined in claim 39, wherein said preset means includes operation means for enabling variable combinations of values to be stored in said memory means.*

*41. The device as defined in claim 36, wherein said selection key means has a plurality of keys, each corresponding respectively to one of said plurality of memory locations.*

*42. The device as defined in claim 36, wherein said numerical value input means further includes operation means for increasing or decreasing the input value.*

*43. A device for setting a copying magnification in a copying apparatus, said device comprising:*

*numerical value varying operation means for increasing or decreasing an input value by a predetermined number;*

*memory means; and*

*control means for storing a value set by said numerical value varying operation means in said memory means, said control means setting an operation mode of said copying apparatus such that said value corresponds to a copying magnification.*

*44. A device for setting a copying magnification in a copying apparatus, said device comprising:*

*numerical value varying operation means for increasing or decreasing an input value by a predetermined number;*

*memory means; and*

*control means for storing a value set by said numerical value varying operation means in said memory means, said control means setting an operation mode of said copying apparatus such that said value is used to set a copying magnification.*

*45. An apparatus for adjusting the magnification setting of a copying machine comprising:*

*a magnification/reduction apparatus contained as part of the copying machine;*

*a storage means for storing in respective memory locations a plurality of preselected data words indicative of a selected magnification/reduction ratio between the size of an image being copied and the size of the reproduced image;*

*a selection means for selecting a respective one of the memory locations;*

*a magnification control means for reading the data word stored in the respective selected memory location for adjusting the magnification/reduction apparatus according to the value of the magnification/reduction ratio stored in the respective memory location.*

*46. The apparatus of claim 45, further comprising:*

*input means for modifying the magnification/reduction ratio in a selected one of at least a first plurality of the respective memory locations.*

*47. The apparatus of claim 45 further comprising:*

*the magnification control means includes a microprocessor which provides an output signal to the magnification/reduction apparatus to control the magnification/reduction apparatus in accordance with data representative of a particular magnification/reduction ratio.*

*48. The apparatus of claim 46, further comprising:*

*the storage means containing a second plurality of memory locations in which is stored magnification/reduction ratios;*

*the second plurality of memory locations having associated therewith a selection key, the operation of which serves to load the contents of the second plurality of memory locations into the magnification control means.*

*49. The apparatus of claim 48 further comprising:*

*an input control switch,*

*means responsive to the operation of the input control switch for loading the second plurality of memory locations, including means for alternatively selecting the contents of stored magnification/reduction values in response to a coded input and to input from the input means.*

*50. The apparatus of claim 48, further comprising:*

*a plurality of selection keys, associated with memory locations for reading into the control means.*

*51. A magnification/reduction setting apparatus for use in a copying machine comprising:*

*a magnification/reduction apparatus contained as*

*a data storage having a first and a second plurality of memory locations,*

*a first data input apparatus connected to the first plurality of memory locations and operatively connected to a magnification/reduction storage apparatus in order to load into the first plurality of memory locations selected data in the storage apparatus representing preselected magnification/reduction values,*

*a second data input apparatus including a plurality of selection keys, each associated with a respective one of the second plurality of memory locations and a numerical value selection apparatus having value selection means and operative to select and display a value to be loaded into the one of the plurality of memory locations associated with the respective selection key,*

*a magnification control apparatus having a microprocessor controller responsive to the selected value stored in the first and second plurality of memory locations.*

* * * * *

UNITED STATES PATENT AND TRADEMARK OFFICE

CERTIFICATE OF CORRECTION

PATENT NO. : Re. 35,274

DATED : June 18, 1996

INVENTOR(S) : KATSUSHI FURUICHI

It is certified that error appears in the above-identified patent and that said Letters Patent is hereby corrected as shown below:

Title page, items

AT [30] FOREIGN APPLICATION PRIORITY DATA

Insert,
--[30] Foreign Application Priority Data
Aug. 26, 1981 [JP] Japan ..... 56-134447
Sep. 26, 1981 [JP] Japan ..... 56-152300
Sep. 28, 1981 [JP] Japan ..... 56-153419--.

AT [56] REFERENCES CITED

Foreign Patent Documents,
"5681865 6/1979 Japan" should be deleted.

COLUMN 2

Line 40, close up right margin.
Line 41, close up left margin.
line 57, "image" should read --image is then--.
Line 66, "photosensitive" should read --photosensitive drum 1--.

COLUMN 3

Line 64, "omitted," should read --omitted.--.

COLUMN 4

Line 31, "dockwise" should read --clockwise--.
Line 67, "magnffication" should read --magnification--.

UNITED STATES PATENT AND TRADEMARK OFFICE

CERTIFICATE OF CORRECTION

PATENT NO. : Re. 35,274

DATED : June 18, 1996

INVENTOR(S) : KATSUSHI FURUICHI

It is certified that error appears in the above-identified patent and that said Letters Patent is hereby corrected as shown below:

COLUMN 5

Line 8, "4," should read --1,--.
Line 15, "4-bit:" should read --4-bit--.
Line 21, "are" should read --is--.
Line 49, "for subroutine" should read --sub-routine--.

COLUMN 6

Line 15, "it-means" should read --it means--.

COLUMN 7

Line 7, "convened" should read --converted--.
Line 15, "subrou-" should read --sub-rou- --.
Line 31, "subroutine" should read --sub-routine--.
Line 48, "subroutine" should read --sub-routine--.

COLUMN 8

Line 41, "*the* the" should read --*the*--.
Line 60, "FIG. 20." should read --FIG. 20-- and "sub-routine" should read --sub-routine,--.

COLUMN 9

Line 19, "step 9, is" should read --step 9.--.
Line 20, "shown." should be deleted.
Line 23, "PLS=" should read --P-PLS=--.
Line 55, "*the* the" should read --*the*--.

UNITED STATES PATENT AND TRADEMARK OFFICE

CERTIFICATE OF CORRECTION

PATENT NO. : Re. 35,274

DATED : June 18, 1996

INVENTOR(S) : KATSUSHI FURUICHI

It is certified that error appears in the above-identified patent and that said Letters Patent is hereby corrected as shown below:

COLUMN 10

Line 9, "either the." should read --either the--.
Line 35, "magnification" should read --magnification factor based--.
Line 36, "[manu-" should read --*manu*- --.
Line 37, "ally]" should read --*ally*--.
Line 44, "comprising: display" should read --comprising: ¶ display--.
Line 49, "determining" should read --determined--.
Line 61, "size.and" should read --size and--.

COLUMN 11

Line 3, "means said" should read --means and said--.
Line 51, "means a" should read --means-- and "magnification" should read --determination means for determining a first magnification--.

COLUMN 13

Line 5, "*group*." should read --*group*--.
Line 40, "*selection*" should read --*a selection*--.
Line 42, "*magnification*" should read --*a magnification*--.

UNITED STATES PATENT AND TRADEMARK OFFICE

CERTIFICATE OF CORRECTION

PATENT NO. : Re. 35,274

DATED : June 18, 1996

INVENTOR(S) : KATSUSHI FURUICHI

It is certified that error appears in the above-identified patent and that said Letters Patent is hereby corrected as shown below:

COLUMN 16

Line 24, "*locations*" should read --*locations, for selecting the contents of the respective memory locations*--.

Line 27, "*as*" should read --*as part of the copying machine,*--.

Line 28, "*storage*" should read --*storage device*--.

Signed and Sealed this

Twenty-fifth Day of February, 1997

*Attest:*

*Attesting Officer*

BRUCE LEHMAN

*Commissioner of Patents and Trademarks*